US010887386B2

(12) United States Patent
Han et al.

(10) Patent No.: US 10,887,386 B2
(45) Date of Patent: Jan. 5, 2021

(54) ADAPTIVE DATA MIRRORING IN VIRTUAL NETWORKS

(71) Applicant: Nicira, Inc., Palo Alto, CA (US)

(72) Inventors: Donghai Han, Beijing (CN); Hua Wang, Beijing (CN); Jingchun Jason Jiang, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 489 days.

(21) Appl. No.: 15/791,090

(22) Filed: Oct. 23, 2017

(65) Prior Publication Data

US 2018/0124171 A1    May 3, 2018

Related U.S. Application Data

(60) Provisional application No. 62/415,230, filed on Oct. 31, 2016.

(51) Int. Cl.
*G06F 15/173* (2006.01)
*H04L 29/08* (2006.01)
(Continued)

(52) U.S. Cl.
CPC ........ *H04L 67/1095* (2013.01); *H04L 43/062* (2013.01); *H04L 43/0817* (2013.01);
(Continued)

(58) Field of Classification Search
CPC ............... H04L 67/1095; H04L 43/062; H04L 43/0817; H04L 43/0876; H04L 43/12; H04L 45/566; H04L 67/14
(Continued)

(56) References Cited

U.S. PATENT DOCUMENTS

2006/0143300 A1* 6/2006 See ................. H04L 43/026
709/227
2015/0016286 A1* 1/2015 Ganichev .......... H04L 45/586
370/252
(Continued)

OTHER PUBLICATIONS

L. A. DaSilva, J. Kibitda, P. DiFrancesco, T. K. Forde and L. E. Doyle, "Customized services over virtual wireless networks: The path towards networks without borders," 2013 Future Network & Mobile Summit, Lisboa, 2013, pp. 1-10. (Year: 2013).*
(Continued)

*Primary Examiner* — Taylor A Elfervig
(74) *Attorney, Agent, or Firm* — Adeli LLP

(57) ABSTRACT

Some embodiments provide a method for providing a continuous mirroring session between a monitored data compute node (DCN) and a monitoring DCN. The method provides such uninterrupted mirroring session regardless of relocations of the DCNs during the mirroring session. In some embodiments, the method dynamically switches between local mirroring and remote mirroring based on the positions of the monitored DCN and the monitoring DCN. Upon receiving a data message from a port of a forwarding element (i.e., a monitored port), to which a monitored DCN is coupled, the method duplicates the data message. The method then sends the duplicated data message either to a monitoring DCN that executes on the same host machine, or adds particular tunneling data to the duplicated data message and tunnels the duplicated data message to a remote host machine, on which the monitoring DCN executes.

21 Claims, 11 Drawing Sheets

(51) Int. Cl.
*H04L 12/26* (2006.01)
*H04L 12/721* (2013.01)

(52) U.S. Cl.
CPC .......... *H04L 43/0876* (2013.01); *H04L 43/12* (2013.01); *H04L 45/566* (2013.01); *H04L 67/14* (2013.01)

(58) Field of Classification Search
USPC ........................................................ 709/224
See application file for complete search history.

(56) References Cited

U.S. PATENT DOCUMENTS

| | | | | |
|---|---|---|---|---|
| 2015/0117445 A1* | 4/2015 | Koponen | ............ | H04L 41/0896 370/389 |
| 2015/0263897 A1* | 9/2015 | Ganichev | ................ | H04L 49/35 370/254 |
| 2015/0381484 A1* | 12/2015 | Hira | ........................ | H04L 45/64 370/390 |
| 2016/0234296 A1* | 8/2016 | Zucca | ................. | H04L 67/1008 |
| 2017/0302569 A1* | 10/2017 | Ramaswamy | .......... | H04L 45/32 |

OTHER PUBLICATIONS

R. Buyya, A. K. Pathan, J. Broberg and Z. Tari, "A Case for Peering of Content Delivery Networks," in IEEE Distributed Systems Online, vol. 7, No. 10, pp. 3-3, Oct. 2006 (Year: 2006).*

S. K. Majhi and S. K. Dhal, "A security context migration framework for Virtual Machine migration," 2015 International Conference on Computing and Network Communications (CoCoNet), Trivandrum, 2015, pp. 452-456 (Year: 2015).*

* cited by examiner

ADAPTIVE DATA MIRRORING IN VIRTUAL NETWORKS

CLAIM OF BENEFIT TO PRIOR APPLICATIONS

This application claims the benefit of U.S. Provisional Patent Application 62/415,230, filed Oct. 31, 2016. U.S. Provisional Patent Application 62/415,230 is incorporated herein by reference.

BACKGROUND

Port mirroring is a powerful network troubleshooting and monitoring tool. With port mirroring, a user can copy packets (e.g. received at a particular port of a switch) to a central device for analysis. The device could be a packet analyzer or intrusion detection system that can help detecting any issue in the network. In physical networks, the port mirroring can only replicate traffic that is visible on the physical port of a switch. In virtual networking, however, a virtual switch has virtual ports that are coupled to virtual machines (VMs). For monitoring a particular VM's traffic, a virtual port to which the particular virtual machine is connected should actually be monitored.

Currently, virtual network traffic can be monitored in different ways. For example, the port mirroring can be set up for the network traffic of a VM to be sent directly to a monitoring VM that operates on the same host machine, or the traffic can be configured to be encapsulated and sent to another host where the monitoring machine operates. In another method of mirroring, where the monitoring machine (e.g., an analyzer server) runs on an external physical device, a physical switch can be configured to forward the mirrored traffic to the analyzer. However, in all of these conventional methods of mirroring, a relocation of the monitored and/or monitoring machine (e.g., from one host machine to another) breaks the mirroring session.

BRIEF SUMMARY

Some embodiments provide a method for providing a continuous mirroring session between a monitored data compute node (DCN) and a monitoring DCN. The method provides such an uninterrupted mirroring session regardless of relocations of the DCNs (i.e., monitored and monitoring DCNs) during the mirroring session. In some embodiments, the method dynamically switches between local mirroring and remote mirroring based on the locations of the monitored DCN (e.g., a virtual machine, a container, a namespace, a physical machine, etc.) and the monitoring DCN (e.g., a virtual machine, a container, a namespace, a physical machine, etc.).

Upon receiving data messages from a port of a forwarding element (i.e., a monitored port), to which a monitored DCN is coupled, the method duplicates the data messages and sends the duplicates to a monitoring DCN. That is, in some embodiments, a monitoring agent (module) intercepts (1) the data messages that are originated by different applications running on the monitored DCN and/or (2) the data messages that are sent to the monitored DCN. The monitoring agent then generates a duplicate data message for each intercepted data message and sends the duplicate data messages to a monitoring DCN.

Before sending the duplicate data messages to the monitoring DCN, the monitoring agent of some embodiments determines whether the monitoring DCN executes on the same host machine on which the monitored DCN executes. Based on this determination, some embodiments either send the duplicate data messages directly to the monitoring DCN (in local or intrahost mirroring), or encapsulate the duplicate data messages with particular tunneling data and tunnel the encapsulated data messages to a remote monitoring DCN (in remote or interhost mirroring). The monitoring agent of some embodiments makes the determination by receiving location status of the different DCNs from a particular database (e.g., a local database stored in the host machine on which the monitoring agent operates). In some embodiments, this particular database is modified and updated by a controller of the network that keeps track of the placements of different DCNs in the network.

For remote mirroring, the monitoring agent of some embodiments directs a managed forwarding element (MFE) executing on the same host as the monitored DCN to encapsulate and tunnel the duplicate data messages to a remote monitoring DCN. The remote monitoring DCN is an end machine that runs on another host machine in some embodiments, while in some other embodiments, the remote monitoring machine is a physical server that is connected to the network (to which the monitored DCN is connected) through a managed hardware switch (e.g., a top of rack hardware switch).

As described, the mirrored (duplicated) data messages may include both data messages (e.g., network packets) that are sent to the monitored DCN from other DCNs, and data messages that are sent to the other DCNs by the monitored DCN. The data packets that are sent to, or received by, the monitored DCN pass through a port of the MFE that is coupled to a virtual network interface controller (VNIC) of the monitored DCN. Therefore, in order to monitor a DCN, some embodiments monitor the port of the MFE to which the DCN is coupled. In some embodiments, the monitoring agent operates in the kernel space (of a virtualization software of the host machine) between a VNIC of a monitored DCN and a port of the MFE to which the monitored DCN is coupled. In some embodiments, the monitoring agent operates on the monitored MFE port and mirrors the data messages that are received at this port. The monitoring agent, in some other embodiments, operates on the VNIC of the monitored DCN.

The particular tunneling data, with which some embodiments encapsulate the duplicate data messages, includes a source virtual tunnel endpoint (VTEP) and a destination VTEP as the source and destination of the data message. The source VTEP operates on the same host machine as the monitored DCN, while the destination VTEP operates on the same host machine as the monitoring DCN. In some embodiments, the source and destination VTEPs are implemented by the MFEs of the source and destination host machines (e.g., each of the source and destination MFEs has a particular port that is assigned a unique internet protocol (IP) address as a tunnel endpoint address). Each of the source and destination VTEPs can also be implemented by a managed hardware switch (e.g., to which a monitoring DCN is coupled) in some embodiments.

The tunneling data, in some embodiments, also includes particular identification data that identifies the encapsulated data message as a mirrored (or duplicate) data message. Some embodiments insert this identification data in a particular field of a tunneling protocol header of the data message. That is, some embodiments insert the identification data into a particular tunnel header field (e.g., in the reserved bits header field) of a mirrored data message in order to mark the data message as a mirrored data message. The tunneling protocol can be any known tunneling protocol such as Virtual Extensible Local Area Network (VXLAN) protocol, Stateless Transport Tunneling (STT) protocol, Secure Socket Tunneling Protocol (SSTP), Geneve, etc., in some embodiments.

After receiving the encapsulated data messages, the destination VTEP (e.g., coupled to a destination MFE operating on a destination host, coupled to a managed hardware switch to which the monitoring server is connected, etc.) decapsulates the data messages. Based on the mirroring identification data, the destination VTEP (or the managed forwarding element, to which the VTEP is coupled) sends the duplicate data messages to the monitoring DCN. In other words, from the mirroring identification data, the destination VTEP realizes that the received data messages are only mirrored data messages and should not be sent to any destination other than the monitoring DCN.

In order to reduce the impact of mirrored traffic on production traffic during a remote mirroring session, some embodiments separate the mirrored traffic route from the production traffic route. That is, when interhost mirroring is set up (or a mirroring session is dynamically switched from intrahost mirroring to interhost mirroring), some embodiments select two different paths for the duplicate data messages (mirrored traffic) and the original data messages that are sent to, or originated by, the monitored DCN (production traffic). In order to do so, some embodiments send the production traffic to a first physical NIC (PNIC) of the host machine on which the monitored DCN operates, and send the mirrored traffic to a second, different PNIC of the host machine. Some embodiments use different source and destination VTEPs on the source and destination hosts that are set up to route traffic through different PNICs of the host machines.

Being able to dynamically switch between interhost and intrahost mirroring for a single mirroring session improves the network's overall efficiency in many other ways as well. For instance, when an interhost mirroring session is initially set up, some embodiments first check the possibility of co-locating the monitoring and monitored DCNs. When the monitoring and monitored DCNs do not execute on the same host machine, some such embodiments move one of the DCNs to the other host machine.

Some embodiments determine other factors before co-locating the monitored and monitoring DCNs. For example, some embodiments consider the workload of the host machines before migrating the DCNs. After both of the monitoring and monitored DCNs are located on the same host machine, these embodiments automatically convert the interhost mirroring session to an intrahost mirroring session.

Some embodiments, irrespective of the workload on the host machines, or other factors, co-locate the monitoring and monitored DCNs to operate on the same host machine whenever the DCNs are set up to communicate remotely (i.e., whenever interhost mirroring is set up). Because interhost mirroring requires that network traffic passes through the physical network (e.g., hardware switches, routers, and cables), some embodiments place the monitoring and monitored DCNs on the same host machine in order to avoid physical network routing and to increase the network efficiency.

Another benefit of adaptive data mirroring handles the occasional situation that the mirrored traffic that a monitoring DCN receives from one or more monitored DCNs overwhelms the monitoring DCN. When the monitoring DCN is not able to handle the received mirrored traffic, some embodiments dynamically relocate the monitoring DCN to a host machine with more resources without interrupting the mirroring session. After such relocation, the network agents of the monitored DCNs dynamically change tunneling data for the monitoring DCN based on the new address of host machine that hosts the monitoring DCN.

In some particular types of remote mirroring sessions, some embodiments utilize a caching mechanism that reduces mirrored traffic and allows for more interhost network bandwidth. Specifically, when the monitored DCN exchanges network traffic with another DCN that executes on the same host machine as the monitoring DCN, network traffic is transferred between the host machines twice, once as production traffic and once as mirrored traffic. Some embodiments employ two different caching mechanisms to reduce the mirroring traffic based on the production traffic being initiated by the monitored DCN, or received by the monitored DCN. The outcome of employing these two different mechanisms is preventing a large data packet being transferred on the physical network twice (i.e., once as a production packet and the second time as a mirrored packet).

In the first scenario, a source DCN operating on a first host machine, along with the monitoring DCN, sends a data message (e.g., a packet) to a monitored DCN which operates on a second host machine. Assuming that the packet passes the firewall policy defined for the monitored DCN, a monitoring agent that executes on the first host machine, generates a duplicate of the packet and caches the duplicate packet before the packet is sent to the second host machine. It is important to note that the monitoring agent is a module with a callback function in the I/O chain of each port of an MFE in some embodiments. As such, the monitoring module is not an exclusive function that is defined only for a monitored DCN.

When the monitoring module executing on the first host machine determines that the packet is originated by the source DCN and is destined for the monitored DCN (e.g., from the source and destination IP addresses of the packet), the monitoring agent makes a copy of the packet. The monitoring agent of the first host machine also calculates a checksum for the copied packet. On the other hand, when the monitoring agent of the second host machine intercepts the packet (before the packet reaches the monitored DCN) and identifies the packet as being sent by the source DCN, the monitoring DCN does not generate a duplicate to be sent to the monitoring DCN on the first host machine.

Instead, after ensuring that the packet passes the firewall policy defined for the monitored DCN, the monitoring agent of the second host machine (operating on the monitored MFE port) calculates the checksum for the packet and inserts the checksum in a special construct (e.g., in a small checksum packet). The monitoring agent of the second host machine then sends the checksum packet (instead of a duplicate of a large data packet) to the first host machine. When the monitoring agent of the first host machine receives the checksum packet, the monitoring agent retrieves the corresponding copy of packet (which has the same checksum) from the cache and delivers the copy of packet to the monitoring DCN on the first host machine. This way, the duplicate of a packet, which could take a large amount of network bandwidth (e.g., hundreds of bytes), is not routed to the physical network between the host machines.

In the second scenario, a monitored DCN operating on a first host machine sends a data message (e.g., a packet) to a destination DCN, which operates on a second host machine, along with a monitoring DCN. Assuming that the packet passes the firewall policy enforced on the monitored DCN, when the monitoring agent that executes on the first host machine determines that the packet is destined for the destination DCN, the monitoring agent calculates a checksum for the packet. That is, instead of generating a duplicate of the packet (which could be a large packet), the agent generates a small checksum packet and sends the checksum (e.g., through a mirroring route) to the second host machine during the mirroring session. The monitoring agent of the second host machine caches the checksum packet.

It is important to note that the original packet is also sent to the second host machine (e.g., through a production route). When the monitoring agent of the second host machine receives the original packet (on its route to the destination DCN) and identifies the packet as being sent by the monitored DCN (e.g., through the source and destination IP addresses of the packet), the monitoring agent calculates the checksum of the packet. The monitoring agent of the second host machine then matches the calculated checksum against the cached checksum packet that was received from the first host machine. If the checksums match, the monitoring agent of the second host machine generates a copy of the packet and delivers the copy to the monitoring DCN on the second host machine.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a method of providing continuous mirroring session between a monitored data compute node (DCN) and a monitoring DCN. The method provides such an uninterrupted mirroring session regardless of relocations of the DCNs (i.e., monitored and monitoring DCNs) during the mirroring session. In some embodiments, the method dynamically switches between local mirroring and remote mirroring based on the positions of the monitored DCN (e.g., a virtual machine, a container, a namespace, a physical machine, etc.) and the monitoring DCN (e.g., a virtual machine, a physical machine such as an event logging server, a container, a namespace, etc.).

Upon receiving data messages from a port of a forwarding element (i.e., a monitored port), to which a monitored DCN is coupled, the method duplicates the data messages and sends the duplicates to a monitoring DCN. That is, in some embodiments, a monitoring agent (module) intercepts (1) the data messages that are originated by different applications running on the monitored DCN and/or (2) the data messages that are sent to the monitored DCN. The monitoring agent then generates a duplicate data message for each intercepted data message and sends the duplicate data messages to a monitoring DCN.

Before sending the duplicate data messages to the monitoring DCN, the monitoring agent of some embodiments determines whether the monitoring DCN executes on the same host machine on which the monitored DCN executes. Based on this determination, some embodiments either send the duplicate data messages directly to the monitoring DCN (in local or intrahost mirroring), or encapsulate the duplicate data messages with particular tunneling data and tunnel the encapsulated data messages to a remote monitoring DCN (in remote or interhost mirroring). The monitoring agent of some embodiments makes the determination by receiving location status of the different DCNs from a particular database (e.g., a local database stored in the host machine on which the monitoring agent operates). In some embodiments, this particular database is modified and updated by a controller of the network that keeps track of the placements of different DCNs in the network.

Figure 1:
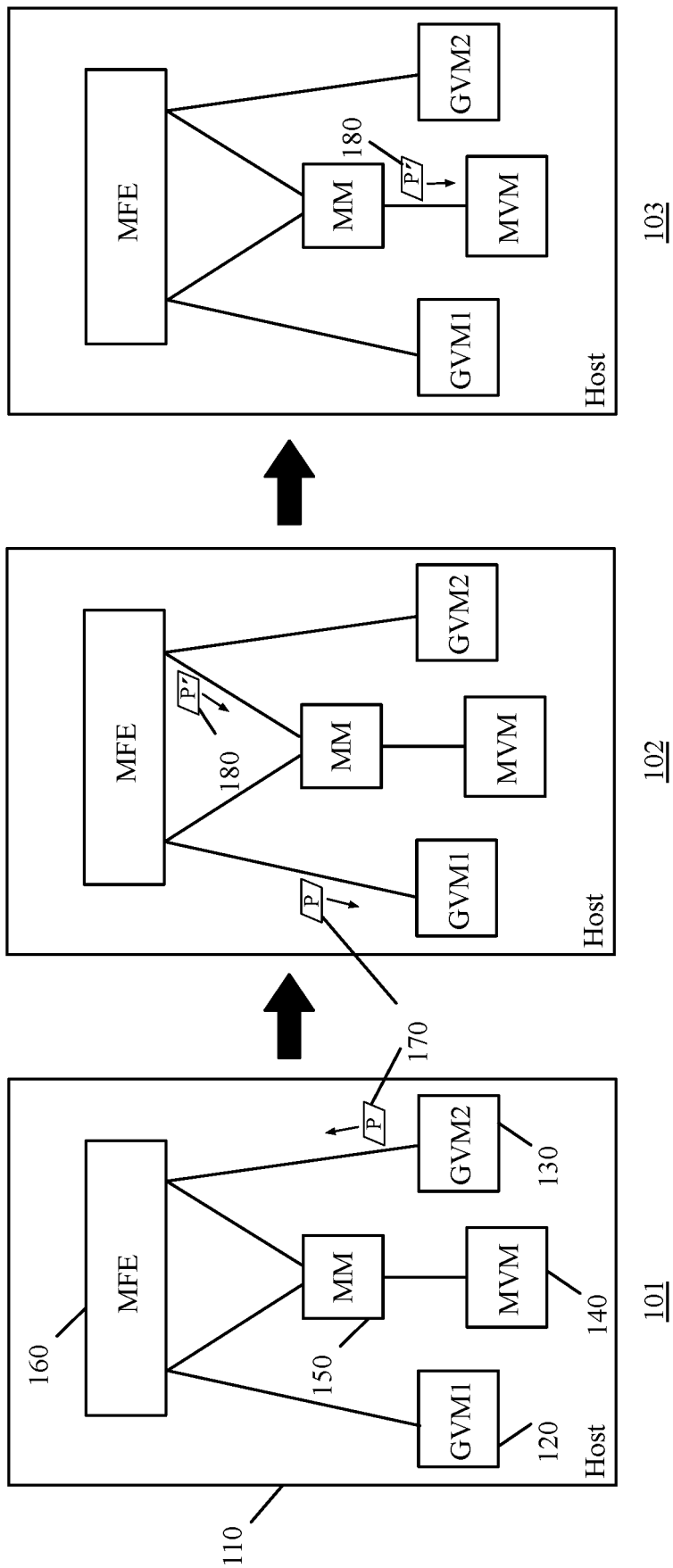
FIG. 1 illustrates a monitoring agent of some embodiments that sends duplicates of packets originated by a source VM to a monitoring VM that operates on the same host machine (intrahost mirroring).

FIG. 1 illustrates a monitoring agent of some embodiments that sends duplicates of packets originated by a source VM to a monitoring VM that operates on the same host machine (intrahost mirroring). Specifically, this figure illustrates, through three different stages 101-103, a monitoring agent that sends a duplicate of a packet, sent by a first guest virtual machine (GVM) to a second GVM, to a monitoring virtual machine (MVM). As shown, the source GVM (i.e., the GVM that sends the packet and is being monitored) executes on the same host machine as the MVM. The packet is received at a monitored port of a managed forwarding element (MFE), to which the source GVM is attached.

FIG. 1 shows a host machine 110 that includes two GVMs 120 and 130, an MVM 140, a monitoring module (MM) 150, and an MFE 160. The host machine 110 can be one of many host machines of a hosting system (e.g., a datacenter) that are connected through a physical network. One or more overlay logical networks (e.g., belonging to one or more tenants of a multi-tenant datacenter) use the physical network as a physical infrastructure to logically connect different virtual and physical machines to each other. GVMs 120 and 130 can be virtual machines of a tenant that operate on the host machine 110 and that are connected to each other (and other virtual machines operating on other host machines) through a set of logical forwarding elements (e.g., logical switches, logical routers, etc.) of a logical network.

In other words, a logical network logically connects different DCNs (e.g., of a tenant in a hosting system), which run on one or more host machines, to each other and to other end machines. In some embodiments, a user defines a logical network topology (i.e., defines the logical network elements and the connections between these elements) for the logical network through a management and control system of the logical network. The management and control system (e.g., a manager machine or application) of a logical network receives the logical network elements, generates configuration data, and pushes the configuration data (i.e., initial as well as runtime configuration data) to a set of physical nodes (e.g., host machines, gateway machines, etc.) of the hosting system in order to configure the physical nodes to implement the logical network entities. The GVMs 120 and 130 might be logically connected to each other through a single logical switch or through different logical switches (e.g., logical switches that are connected each other through a logical router).

In some embodiments, the MFE 160 is one of a set of managed forwarding elements (e.g., managed software switches) that operate on a set of host machines (e.g., in the hypervisors of the host machines) and implement the logical forwarding elements (e.g., LFEs). For example, in order to implement a logical port of a logical switch to which GVM 120 is coupled, the logical port of the logical switch is mapped to a physical (software) port of the MFE 160, to which the GVM 120 is connected.

For instance, in the illustrated example, a first logical port of a logical switch is mapped to a physical port of the MFE 160, to which GVM130 is coupled, while a second logical port of the logical switch is mapped to another physical port of the MFE, to which GVM120 is coupled. In some embodiments, a local controller (not shown) that executes on each host machine (e.g., in a hypervisor of the host machine) receives configuration data from the management and control system and configures a corresponding MFE to perform forwarding operations for the LFEs. In some embodiments, the MFEs that execute on different host machines implement different virtual tunnel endpoints (VTEPs), e.g., through a particular port of each MFE, that ultimately exchange the logical network data between the DCNs of different host machines.

In some embodiments a collecting agent operating on each port of the MFE 160, to which a VM is connected, can intercept the packets sent to and/or received from the VMs. The collecting agent can be configured to intercept and make a duplicate of each packet to be sent, e.g., to a monitoring VM such as the MVM 140. In some embodiments the monitoring module (MM) 150 receives the duplicated packets from a collection agent and sends the packets to the MVM, while in other embodiments, the MM 150 and the collection agent are the same. That is, although in the illustrated example, the MM 150 is shown to be separate from the MFE and to receive a duplicate packet 180 from a collection agent operating on a port of the MFE 160, in some embodiments the MM 150 operates on the port of the MFE as the collection agent and generates duplicates of the packets itself.

In some embodiments, the collection agent (or the MM 150) operates on a virtual network interface controller (VNIC) of each VM (instead of the ports of MFE) and intercepts the packets that are passing through the VNIC. The MVM 140, in some embodiments, is a network event logger that logs and sends the network events to an analyzer machine, while in other embodiments, the MVM 140 logs and analyzes the network events. In some embodiments, MVM 140 belongs to the same network to which the GVMs 120 and 130 belong (e.g., the same logical network of a tenant) and reports the network events to the logical network administrator, while in other embodiments the MVM reports the network events to other entities (e.g., a datacenter network administrator).

In some embodiments, a user (e.g., a network administrator) defines (e.g., through management and control system of the network) which end machines' traffic has to be monitored, and which end machines have to act as the monitoring machines. In some embodiments, a user defines which port of a logical switch (or MFE) has to be monitored (or mirrored) and the mirrored data should be sent to which other port of the logical switch. The user can also define whether the ingress traffic, the egress traffic, or both the ingress and egress traffics of a port should be mirrored. In some embodiments, a user configures the monitoring DCN and monitoring module through application programming interface (API) calls to a manager computer (or application) in the management and control system of the network.

After describing the different elements shown in the figure, the operational stages 101 and 102 are now described. In the first stage 101, the GVM 130 initiates a packet 170 to be forwarded to the GVM 120. The packet 170 could be a packet that is initiated by one of the applications executing in GVM 130 in order to be sent to one of the applications executing in GVM 120. The two applications might be two different instances of a distributed application that is implemented on multiple GVMs including GVMs 130 and 120. As shown, GVM 130 sends the packet to MFE 160 (e.g., a software switch operating in the hypervisor of the host machine) to perform forwarding processing on the packet (e.g., based on the data stored in the packet headers) and to forward the packet towards its destination.

The MFE 160, after receiving the packet, executes the necessary forwarding pipelines of the logical network elements (e.g., the logical switch to which GCM 130 is connected) in order to identify the next destination of the packet and then forwards the packet to the identified destination. For example, when the MFE 160 receives the packet 170 from GVM 130, the MFE performs the network forwarding processing for a logical port of the logical switch, to which the GVM is logically coupled. The MFE, also performs the forwarding processing for any additional logical forwarding element (e.g., a logical router if the logical switch is connected to the logical router). In the illustrated example, based on the forwarding processing, the MFE 160 sends the packet from the first logical port of the logical switch, implemented by the MFE, to a second logical port of the logical switch, which is coupled to the GVM 120 and which is also implemented by the MFE.

The second stage 102 shows that not only the original packet 170 is sent towards its destination (i.e., GVM 120), a copy of the packet is also generated (i.e., packet 180) and being sent to the monitoring module 150. In order to do so, as described above, a packet collection module operating in the hypervisor (between the VNIC of the GVM 130 and the software port of MFE 160) generates a duplicate of the packet and sends the duplicate packet 180 to the MM 150. In some embodiment, the collection agent only sends the outgoing packets (i.e., packets that are initiated and sent out by the GVM) to the monitoring module. In some other embodiments, the collection agent sends both outgoing packets (from the GVM) and incoming packets (to the GVM) to the monitoring module.

In yet some other embodiments, a user can configure the source of the packets that should be sent to the MM 150 (e.g., to be the ingress port, the egress port, or both ports of the GVM) through a monitoring policy that the user defines for a controller of the network. As described above, in some embodiments, the monitoring module 150 is the same as the collection agent and executes on the software port of MFE 160 (or the VNIC of GVM 120) to intercept the packets and generate duplicates.

The third stage 103 shows that the MM 150 has determined that the monitoring VM is operating on the same host machine (and not a remote host machine), and therefore sends the duplicate packet 180 directly to the MVM 140. That is, since the source GVM (i.e., the monitored VM) and the MVM (i.e., the monitoring VM) execute on the same host machine, the MM 150 does not add any specific tunneling data to the duplicate packet. In some embodiments, as will be described in more detail below by reference to FIG. 5, the monitoring module identifies the locations of different VMs of a network using a local database that keeps track of current execution location of the VMs.

While the GVMs and MVM are shown as VMs in this figure and other figures below, it should be understood that other types of data compute nodes (e.g., namespaces, containers, etc.) may connect to logical forwarding elements in some embodiments. It should also be understood that a monitoring DCN does not have to be a DCN that executes on a host machine. For instance, in some embodiments, the monitoring DCN is a physical end machine (a standalone server or other type of computing device) that is connected to a managed hardware switch, through which, the physical end machine connects to the logical network.

In some such embodiments, the management and control system of network configures and manages both of the managed software switches (such as MFE 160) and the managed hardware switches, to implement the logical network entities (e.g., LFEs, logical firewalls, logical NATs, etc.). Additionally, one of ordinary skill in the art would realize that the host machine 110 may include many more DCNs executing on the host machine, as well as many more modules and databases that are not shown in this figure for simplicity of description. Lastly, in this document, the term "packet" refers to any data message comprised of a collection of bits in a particular format sent across a network (physical or logical).

Figure 2A:
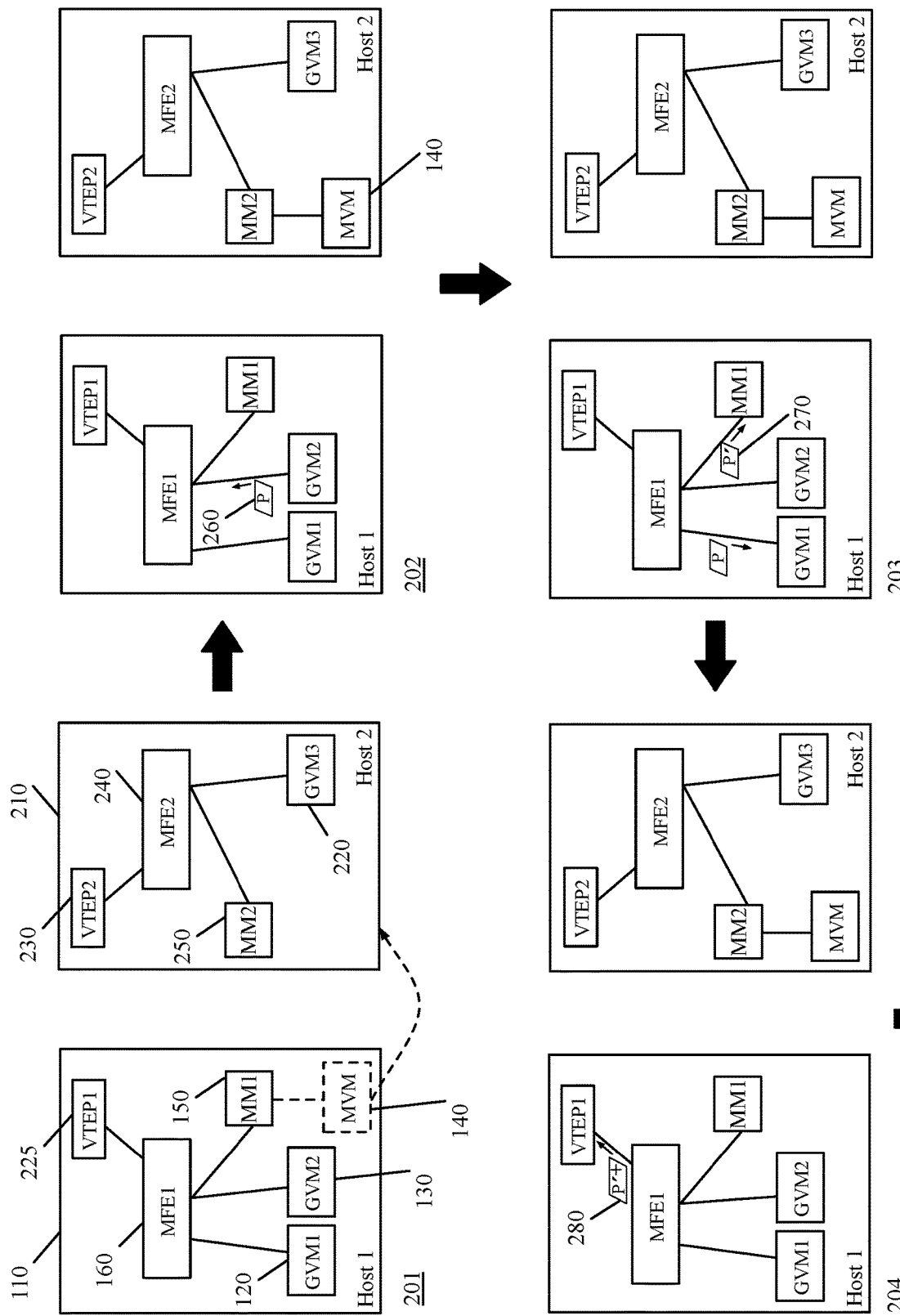
FIGS. 2A-2B illustrate the monitoring agent of FIG. 1 tunneling duplicates of packets originated by a source VM to a monitoring VM that operates on a different host machine (interhost mirroring).
Figure 2B:
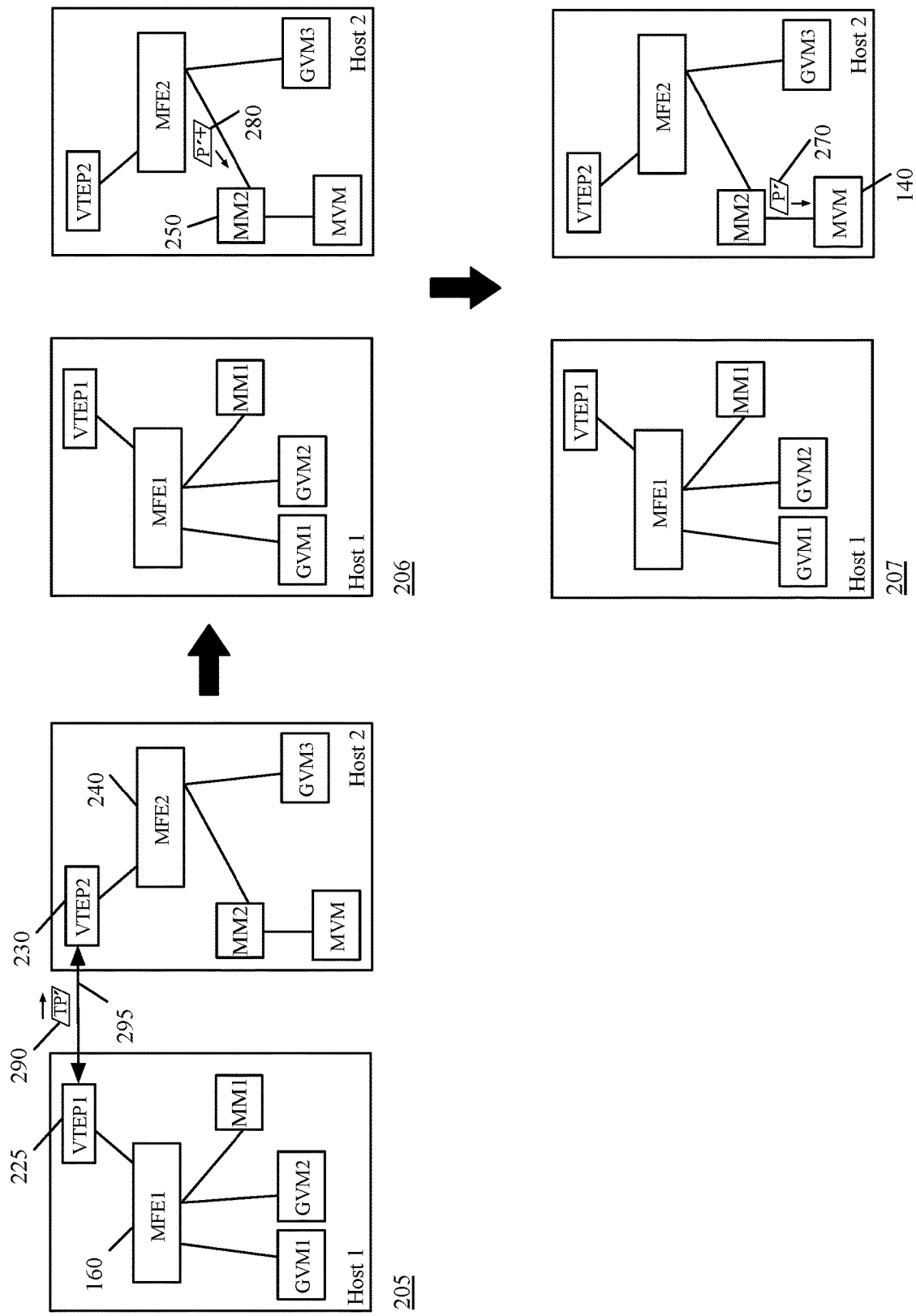

FIGS. 2A-2B illustrate the monitoring agent of FIG. 1 tunneling duplicates of packets originated by a source VM to a monitoring VM that operates on a different host machine (interhost mirroring). Specifically, these figures show, through seven different stages 201-207, how a monitoring module dynamically switches from intrahost to interhost mirroring in the middle of a mirroring session. That is, after a monitoring VM is migrated from one host machine to another, the monitoring module automatically changes an intrahost mirroring session to an interhost mirroring session without any user intervention (e.g., without a user changing the configuration of the mirroring session from local to remote).

FIG. 2A shows the same host machine 110 that was illustrated above in FIG. 1, which includes the two GVMs 120 and 130, MVM 140, MM 150, and MFE 160. The host machine 110, in this figure, also includes a virtual tunnel endpoint (VTEP) 225 that is implemented on a port of MFE 160. This figure also includes a second host machine 210 that operates another MFE 240, to which, GVM 220 and VTEP 230 are connected. Monitoring module 250 is also shown to operate on the port of the MFE, to which, GVM 220 is coupled.

As discussed above, MM 250 operates as a filter on a port of the MFE to intercept the packets that pass through the port (if the port is configured as a mirroring port). In other words, the modules 150 and 250 are shown as separate elements from the MFEs only to simplify the description. Otherwise, in some embodiments, modules 150 and 250 are implemented on their corresponding ports of the MFEs in order to collect and duplicate data messages, and to decide where to send the duplicate data messages.

The first stage 201 of the figure illustrates that the monitoring VM 140 is being migrated from host machine 110 to the host machine 210 in the middle of a mirroring session. For example, this stage can be a continuation of the last stage in FIG. 1, in which an intra host mirroring session was active between the GVM 130 and the MVM 140 (i.e., the packets sent by (to) GVM 130 were mirrored to MVM 140).

In some embodiments a migrator module that operates on each host machine is responsible for relocating the VMs that operate on the same host machine. The VMs are migrated from one host machine to another for many different reasons. For example, when a host machine is deemed to be stressed (i.e., when the host machine is running out of resources), a migrator module of the host machine may relocate one or more of the VMs executing on the host machine to another host machine. In some embodiments, each migrator module is configured and managed by a controller (in management and control system of the network) that communicates the configuration and management data with the host machines through control and management channels.

The second stage 202 shows that the MVM 140 is migrated to the host machine 210 and now is executing on this host machine. This stage also shows that GVM 130 has initiated and sent another packet 260 to GVM 120 that also executes on host machine 110. The packet is being forwarded to the MFE 160 (e.g., by the VNIC of the GVM 120) to perform forwarding pipelines of the different logical elements in the logical network and to forward the packet towards its final destination.

The third stage 203 shows that the MFE is sending the original packet 260 towards its final destination (i.e., destination GVM 120). Also, the collection agent operating on the port, to which GVM 130 is coupled, is sending a duplicate of the packet (i.e., duplicate packet 270) to the monitoring module 150. As described, the monitoring module 150 is the collection agent which generates the duplicate packet 270 in some embodiments. MM 150 is shown as a separate entity from the port only to simplify the description. In some other embodiments, however, a collection agent that intercepts the packets at the port and generates a copy for each packet, is a separate entity from the monitoring module 150 (as shown in this and other figures).

The fourth stage 204 shows that the MM 150 has recognized that the monitoring VM is not operating on the same host machine any more and instead, has been moved to the host machine 210. As described above, the monitoring module uses one or more databases that keep track of the locations of DCNs in order to determine where the monitoring DCN is currently executing. Since the monitoring VM 140 is now operating in the remote host machine 210, the monitoring module automatically and without any interruption in the mirroring session, switches the mirroring session from an intrahost mirroring to an interhost mirroring.

In order to do so, in some embodiments, MM 150 directs the MFE 160 to add specific tunneling data to the duplicate packet 270. As shown in the fourth stage 204, based on the instructions of the monitoring module, MFE 160 adds particular identification data to on or more packet headers of the duplicate packet (e.g., one or more reserved tunnel headers of the packet). This particular identification data tags the packet as a mirrored packet so when a destination VTEP receives the packet, the destination VTEP will know that the destination of the mirrored packet identified in a destination header of the packet is not a real destination for sending the packet.

Instead, the destination VTEP sends the tagged packet to a monitoring VM which is coupled to a destination MFE that implements the destination VTEP. In some other embodiments, the monitoring module 150 adds the tunneling data to the mirrored packet itself (instead of directing the MFE to do so). As shown in the fourth stage 204, the modified packet 280, which contains the additional mirroring tag (i.e., the identification data), is being forwarded by the MFE 160 to the source VTEP 225. As discussed, the source VTEP, in some embodiments, is not a separate entity form the MFE (the way illustrated in this figure). Instead, each VTEP is implemented by a port of a corresponding MFE. However, for the simplicity of description, the VTEPs are shown as separate entities from the MFEs.

The fifth stage 205 shows that after the VTEP 225 receives the tagged mirrored packet 280, the VTEP adds additional tunneling data to the packet based on the instructions received from the MM 150 and the MFE 160. This stage also shows that the packet 290, which has additional tunneling data compared to the tagged mirrored packet 280, is being sent from the first MFE 160 to the second MFE 240 through the tunnel 295. In order to do so, the first VTEP 225 encapsulates the packet with necessary tunneling information (e.g., IP addresses of source and destination VTEPs, etc.) and tunnels the packet towards the destination VTEP 230 implemented by a port of the second MFE 240.

The tunneling of the packets, as described in more detail below by reference to FIG. 7, includes sending the packets to a physical network interface controller (NIC) of the source host machine. The physical NIC of the source host machine then forwards the encapsulated packet to the destination host machine through a physical network that connects the two host machines to each other (i.e., the same physical network infrastructure on which the logical network is implemented).

The sixth stage 206 shows that the second MFE 240 receives the packet 290, decapsulates the packet, and then forwards the decapsulated mirrored packet 280 to the monitoring module 250. As shown, the packet still carries the additional tagging data that identifies the packet as a mirrored packet. The seventh and final stage 207 shows that after receiving the packet, the monitoring module 250 removes the identification data from the duplicate packet 270 and forwards this packet to the monitoring VM 140 that is migrated to host machine 110. Although the removing of identification data is shown to be done by the MM 250, in some embodiments, the MFE 240 removes this identification data from the packet and sends the duplicate packet directly to the monitoring VM 140.

Figure 3:
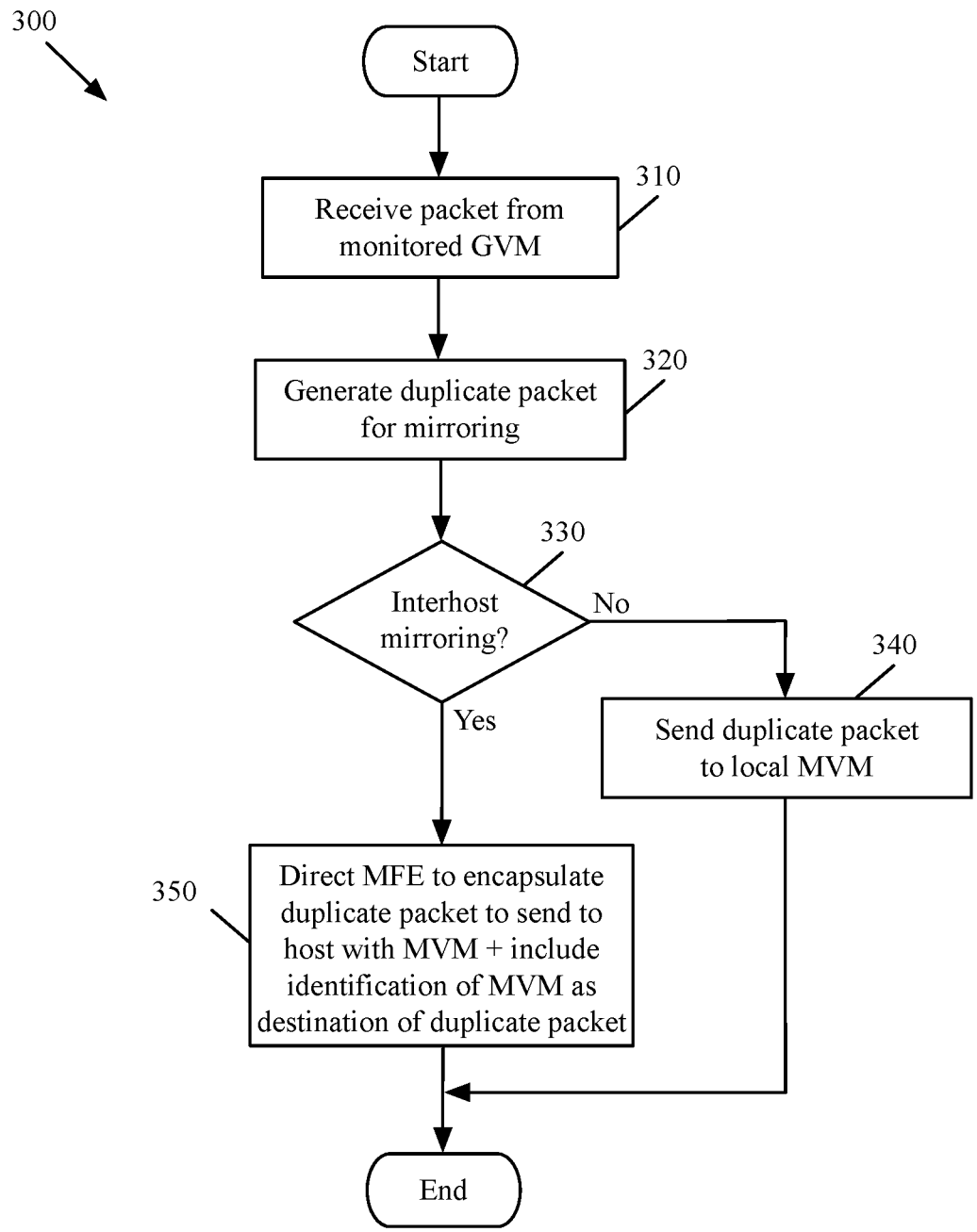
FIG. 3 conceptually illustrates a process of some embodiments for automatically switching between interhost and intrahost mirroring during a mirroring session.

FIG. 3 conceptually illustrates a process 300 of some embodiments for automatically switching between interhost and intrahost mirroring during a mirroring session. In some embodiments, the process is performed by a monitoring module that operates on a port of an MFE to which a logical port of a logical switch that has to be monitored is mapped. That is, in some embodiments, a port of a logical switch, to which a DCN is coupled, is mapped to a port of an MFE and a monitoring module operating on this port, performs the process 300. In some other embodiments, the monitoring module operates on a VNIC of a monitored DCN that is coupled to the port of MFE. In some embodiments, the monitoring module has a callback function that executes in a kernel space of a virtualization software (e.g., hypervisor) of the host machine, on which the monitored DCN executes.

The process starts by receiving (at 310) a packet from a monitored GVM executing on a host machine. As described above the packet might be one of the packets of an ingress data flow to the GVM, or an egress data flow from the GVM. In other words, the packet can be an outgoing packet that is sent from one of the applications running on the GVM, or an incoming packet destined for a particular application executing on the GVM. The packet might be received at a port of an MFE executing in a hypervisor of the host machine. The MFE port is configured to mirror ingress and egress traffic to and from a VNIC port of the GVM that is coupled to the MFE.

At 320, the process generates a duplicate (mirror) packet from the received (intercepted) packet. The process then determines (at 330) whether the mirroring session is an interhost mirroring or an intrahost mirroring. That is, the process determines whether a monitoring machine executes on the same host machine that the monitored VM is executing or on a remote host machine. The process of some embodiments makes such determination through a database that receives VMs' network status from a central management and control system (e.g., through a migrator module that runs on the host machine).

When the process determines that the mirroring session is an intrahost mirroring session, the process sends (at 340) the generated duplicate packet to the local monitoring VM (MVM) that executes on the same host machine. The process then ends. On the other hand, when the process determines that the mirroring session is an interhost mirroring session, the process sends the duplicate packet to a managed forwarding element (MFE) that runs on the host machine and directs the MFE to add specific tunneling information to the duplicate packet, before sending the duplicate packet to the other host machine on which the monitoring VM executes (or to the managed hardware switch, to which the MVM is connected). The process then ends. The specific tunneling data, in some embodiments, includes identification data that identifies the packet as a mirrored packet, as well as necessary tunneling data to encapsulate the packet from a VTEP of the source host machine to the VTEP of the destination host machine.

The specific operations of the process 300 may not be performed in the exact order shown and described. The specific operations may not be performed in one continuous series of operations, and different specific operations may be performed in different embodiments. For example, the process of some embodiments does not direct the MFE to add the mirroring identification data to the packet. Instead, the process itself adds the identification data to the packet and sends the packet to the source VTEP to add the other tunneling information (e.g., source VTEP and destination VTEP IP addresses) to the packet. Additionally, the process 300 could be implemented using several sub-processes, or as part of a larger macro process.

As described above, the particular tunneling data, with which some embodiments encapsulate the duplicate data messages, includes a source VTEP and a destination VTEP as the source and destination of the data message. The source VTEP operates on the same host machine as the monitored DCN, while the destination VTEP operates on the same host machine as the monitoring DCN. In some embodiments, the source and destination VTEPs are implemented by the MFEs of the source and destination host machines (e.g., each of the source and destination MFEs has a particular port that is assigned a unique internet protocol (IP) address as a tunnel endpoint address). Each of the source and destination VTEPs can also be implemented by a managed hardware switch (e.g., to which a monitoring DCN is coupled) in some embodiments.

The tunneling data, in some embodiments, also includes particular identification data that identifies the encapsulated data message as a mirrored (or duplicate) data message. Some embodiments insert this identification data in a particular field of a tunneling protocol header of the data message. That is, some embodiments insert the identification data into a particular tunnel header field (e.g., in the reserved bits' header field) of the mirrored data message in order to mark the data message as a mirrored data message. The tunneling protocol can be any known tunneling protocol such as Virtual Extensible Local Area Network (VXLAN) protocol, Stateless Transport Tunneling (STT) protocol, Secure Socket Tunneling Protocol (SSTP), Geneve, etc., in some embodiments.

After receiving the encapsulated data messages, the destination VTEP (e.g., coupled to a destination MFE operating on a destination host, coupled to a managed hardware switch to which the monitoring server is connected, etc.) decapsulates the data messages. Based on the mirroring identification data, the destination VTEP (or the managed forwarding element, to which the VTEP is coupled) sends the duplicate data messages to the monitoring DCN. In other words, from the mirroring identification data, the destination VTEP realizes that the received data messages are only mirrored data messages and should not be sent to any destination other than the monitoring DCN.

Figure 4:
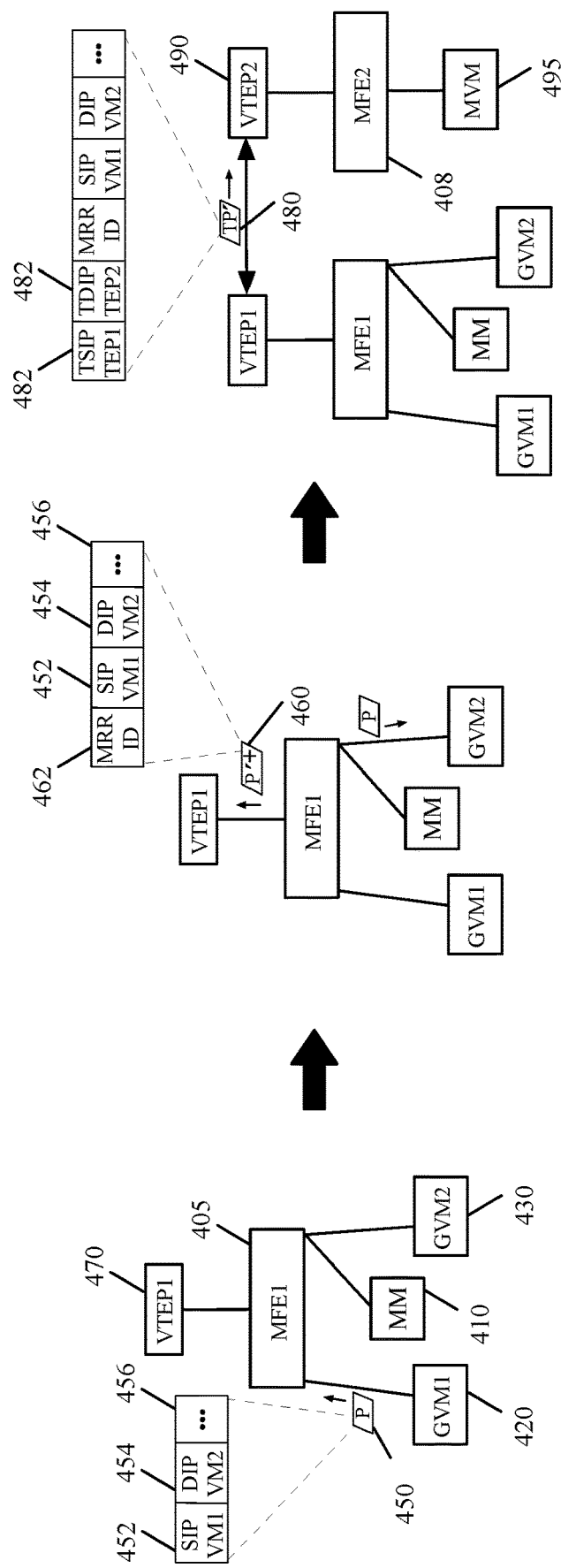
FIG. 4 conceptually illustrates insertion of particular tunneling data to a mirrored packet that should be tunneled to a remote host machine in an interhost mirroring session.

FIG. 4 conceptually illustrates insertion of particular tunneling data to a mirrored packet that should be tunneled to a remote host machine in an interhost mirroring session. Specifically, this figure shows, through three different stages 401-403, how mirroring and tunneling data is added to a duplicate of a packet that is being sent from a source VM to a destination VM. The figure includes a first MFE 405 that is connected to two guest VMs 420 and 430. MFE 405 also implements a first VTEP 750 (e.g., on a particular port of the MFE) and monitoring module 410 (e.g., on a monitored port of the MFE which is coupled to the monitored GVM 430). This figure also includes a second MFE 408 (shown at stage 403) that is coupled to a monitoring VM 495 and that implements a second VTEP 490.

At the first stage 401, GVM 420 sends a packet 450 to GVM 430. A user has configured the network to monitor the ingress and egress network traffic of the GVM 430. As such, MM 410 operating on the MFE, port to which the DCN is connected, intercepts the packet going to and coming out of GVM 430 to mirror the packets. The packet is being sent to the MFE 405 because the port of a logical switch to which the GVM 420 is logically connected is implements by the MFE 405. This stage also shows that the packet 450 includes many packet headers including a source IP header 452 that has a source IP address of GVM 420 and a destination IP header 454 that includes a destination IP address of GVM 430. As shown, the packet has other data 456 that includes other headers and payload of the packet.

The second stage 402 shows that the MFE 405 has performed forwarding processing for the different logical ports of a logical switch that connects the two GVMs (or different ports of different logical forwarding elements that connect the two GVMs) and sends the packet 450 to its final destination machine GVM 430. This stage also shows that the monitoring module 410 operating on the same port of the MFE that is coupled to the destination VM has intercepted the packet 450 (e.g., before the packet is sent to the GVM 430), generated a duplicate packet from original packet 450, and added additional mirroring identification data to the duplicate packet (e.g., by directing the MFE 405 to add this data to the packet).

The tagged packet 460 is then being forwarded to the VTEP 470 to be tunneled to the destination source machine. The second stage 402 also shows that the packet 460, includes the same source and destination addresses 452 and 454 as the original packet. In addition, the tagged packet 460 carries particular identification data 462 that identifies the packet as a mirrored packet. This particular identification data, as described above, may be carried by reserve bits that are stored in one or more tunnel headers of the packet.

The third stage 403 shows that the VTEP 470, after receiving the tagged packet 460, added additional tunneling data to the packet and as a result tunnels the packet 480 to the second MFE 408, to which, MVM 495 is coupled. This stage also shows that the packet 480, includes the same source and destination addresses 452 and 454, as well as the same mirroring identification data 462, as the tagged and mirrored packet 460. In addition, the tunneled packet 480 carries tunnel headers 482 and 484 that carry source and destination VTEPs' IP addresses, respectively.

When VTEP 490 receives the tunneled packet 480, it decapsulates the packet from the tunneling data (e.g., removes the packet headers 482 and 484) and sends the decapsulated packet to the MFE 408. The MFE then based on the mirroring identification data carried in another header of the packet (e.g., packet header 462) realizes that the source and destination IP addresses in the packet are not the real source and destination for the packet. Instead, the packet is a mirrored packet that has to be forwarded to the monitoring VM 495 for further analysis of the packet. As such, the MFE 408 removes the mirroring identification header 462 from the packet and sends the packet, which is now an exact duplicate of the original packet 450, to the MVM 495.

As described above, for remote mirroring, the monitoring agent of some embodiments directs a managed forwarding element (MFE) executing on the same host as the monitored DCN to encapsulate and tunnel the duplicate data messages to a remote monitoring DCN. The remote monitoring DCN is an end machine that runs on another host machine in some embodiments, while in some other embodiments, the remote monitoring machine is a physical server that is connected to the network (to which the monitored DCN is connected) through a managed hardware switch (e.g., a top of rack hardware switch).

In some embodiments, the mirrored (duplicated) data messages may include both data messages (e.g., network packets) that are sent to the monitored DCN from other DCNs, and data messages that are sent to the other DCNs by the monitored DCN. The data packets that are sent to, or received by, the monitored DCN pass through a port of the MFE that is coupled to a virtual network interface controller (VNIC) of the monitored DCN. Therefore, in order to monitor a DCN, some embodiments monitor the port of MFE to which the DCN is coupled. In some embodiments, the monitoring agent operates in the kernel space (of a virtualization software of the host machine) between a VNIC of a monitored DCN and a port of the MFE to which the monitored DCN is coupled. In some embodiments, the monitoring agent operates on the monitored MFE port and mirrors the data messages that are received at this port. The monitoring agent, in some other embodiments, operates on the VNIC of the monitored DCN.

Figure 5:
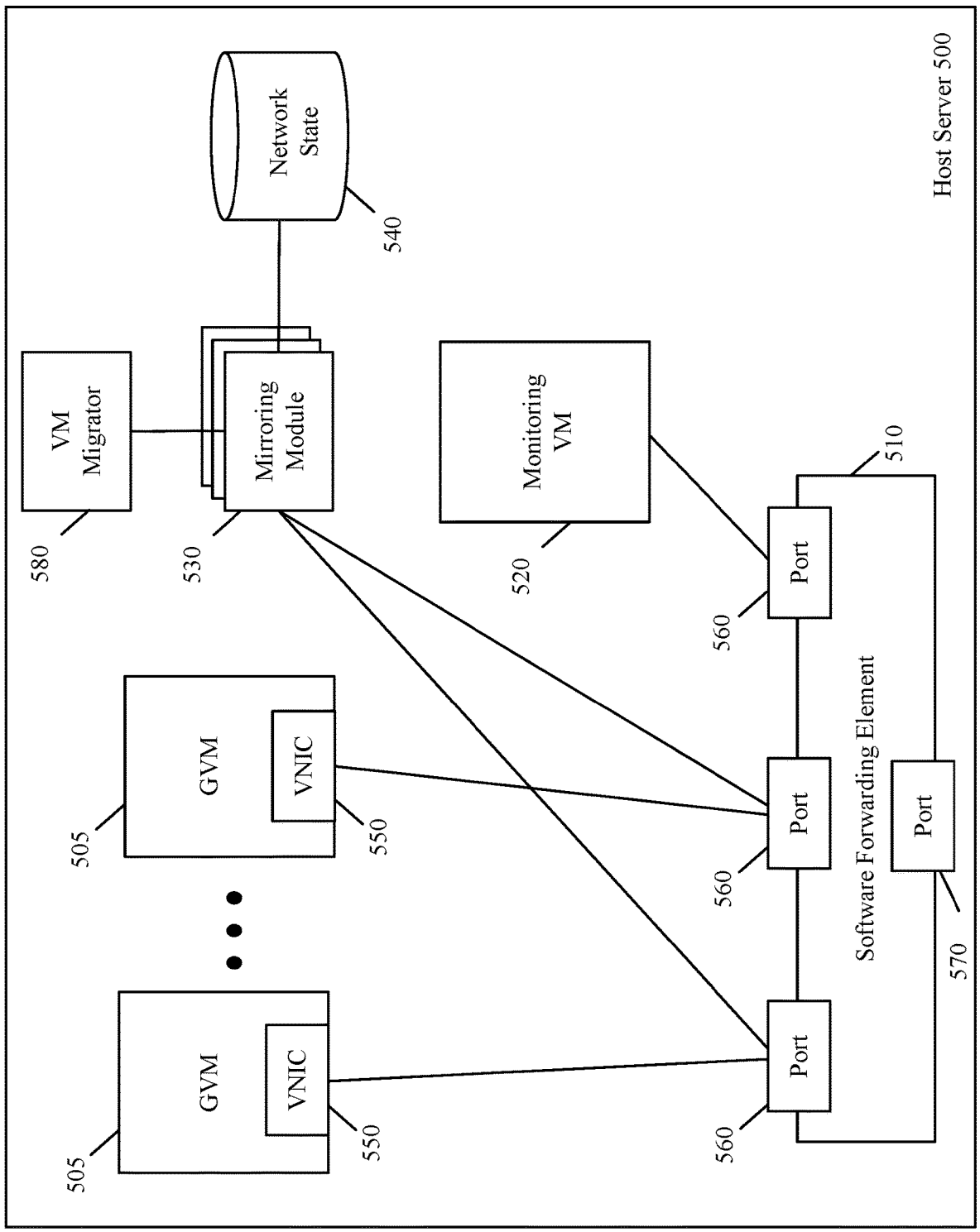
FIG. 5 illustrates an example of a monitoring (mirroring) module operating on a host computing device (e.g., a server).

FIG. 5 illustrates an example of a monitoring (mirroring) module operating on a host computing device (e.g., a server). The figure shows a host machine 500 that includes a set of GVMs 505 and a monitoring VM 520. The host machine, in addition to the GVMs and MVM, also includes a managed forwarding element 510 that is coupled to the GVMs (i.e., the ports 560 of the software switch are coupled to VNICs 550 of the GVMs). In some embodiments, each VNIC of a VM is associated with a unique port of the software switch.

It is important to note that the software switch 510 is also referred to as a physical forwarding element or a physical switch in order to distinguish the software switch from logical forwarding elements, which are logical constructs that are not tied to the physical world. In other words, the software switch is referred to as physical switch because the software switch exists and operates in the physical world, whereas a logical forwarding element (e.g., a logical switch or router) is simply a logical representation of a forwarding element that is presented to a user or a program in some embodiments. The host 200 also includes a set of monitoring modules 530, a network state data storage 540, and a DCN migrator 580. In some embodiments, the software forwarding element 510 of the host machine, as well as the set of monitoring modules 530 and the migrator 580 operate in the kernel space of the host machine 500 (e.g., in a hypervisor executing on the host machine).

The GVMs are virtual machines (or servers) executing on top of the hypervisor (not shown). Examples of such virtual machines include web servers, application servers, database servers, etc. In some cases, all of the GVMs belong to one entity, e.g., an enterprise that operates the host machine. In other cases, the host machine executes in a multi-tenant environment (e.g., in a multi-tenant datacenter), and different GVMs may belong to one tenant or to multiple tenants of the datacenter.

As shown, each GVM 505 includes a virtual network interface controller (VNIC) 550 in some embodiments. Each VNIC is responsible for exchanging packets between its corresponding VM and the software forwarding element 510. Each VNIC connects to a particular port of the software forwarding element 510. The software forwarding element 510 also connects to a physical network interface controller (PNIC) of the host machine 500 (not shown). In some embodiments, the VNICs are software abstractions of a PNIC that are implemented by the virtualization software of the host machine (e.g., by the hypervisor).

In some embodiments, the software forwarding element maintains a single port 560 for each VNIC of each VM. The software forwarding element 510 connects to a PNIC (e.g., through a NIC driver) to send outgoing packets from the VMs and to receive incoming packets for the VMs. In some embodiments, the software forwarding element 510 is defined to include a port 570 that connects to the PNIC's driver to send and receive packets to and from the PNIC. Although the switch 510 is shown as having a single port 570, a software switch, in some embodiments, as shown below in FIG. 7, includes two or more ports that connect to one or more PNICs of the host machine.

The software forwarding element 510 performs packet-processing operations to forward packets that it receives on one of its ports to another one of its ports. For example, in some embodiments, the software forwarding element tries to use data in the packet (e.g., data in the packet header) to match a packet to flow based rules, and upon finding a match, to perform the action specified by the matching rule (e.g., to hand the packet to one of its ports 560 or 570, which directs the packet to be supplied to a destination GVM or to the PNIC).

In some embodiments, the software forwarding element 510 is a software switch, while in other embodiments it is a software router or a combined software switch/router. The software forwarding element 510, in some embodiments, implements one or more logical forwarding elements (e.g., logical switches or logical routers), along with other software forwarding elements executing on other host machines in a multi-host environment. A logical forwarding element, in some embodiments, may span multiple host machines to connect GVMs that execute on different host machines but belong to one logical network.

In other words, different logical forwarding elements can be defined to specify different logical networks for different users, and each logical forwarding element can be defined by multiple software forwarding elements on multiple hosts. Each logical forwarding element isolates the traffic of the GVMs of one logical network from the GVMs of another logical network that is serviced by another logical forwarding element. A logical forwarding element can connect GVMs executing on the same host and/or different hosts.

In hypervisors, software switches are sometimes referred to as virtual switches because they operate in software and they provide the GVMs with shared access to the PNIC(s) of the host. However, in this document, as described above, software switches are referred to as physical switches because they are items in the physical world. This terminology also differentiates software switches from logical switches, which are abstractions of the types of connections that are provided by the software switches.

The ports of the software forwarding element 510, in some embodiments, include one or more function calls to one or more modules that implement special input/output (I/O) operations on incoming and outgoing packets that are received at the ports. In some embodiments, one of these function calls can be to a mirroring module 530 that duplicates the packets and sends the duplicate packets to a monitoring DCN such as the MVM 520. Other examples of I/O operations that are implemented by the ports 560 include firewall operations, ARP broadcast suppression operations, DHCP broadcast suppression operations, etc.

By implementing a stack of such function calls, the ports can implement a chain of I/O operations on incoming and/or outgoing packets in some embodiments. Also, in some embodiments, other modules in the data path (such as the VNICs, etc.) implement the I/O function call operations (such as the function calls to a mirroring module), instead of the ports of the software switch.

In some embodiment, each mirroring module 310 intercepts the data messages on a specific port 560 of the software switch 510 (e.g., packets originated by different applications that run on a GVM) between the VNIC of the GVM and the software switch port to which the GVM is coupled. The module generates and sends a duplicate of each data message to an MVM that either operates on the same host machine or on a different remote host machine. In other words, in some embodiments, while the original data message (e.g., packet) is sent towards its final destination, a mirroring module intercepts the packet (e.g., through an I/O function call), generates a copy of the packet, and sends the copy of the packet to a monitoring machine.

In some embodiments, a monitoring module 530 in a set of monitoring modules is assigned to receive packets from a particular port 560 of the software switch 510 (or from a particular VNIC 550 of a GVM 505). Each monitoring module 530 receives the packets on a port, generate duplicate packets from the received packets, and determines whether the duplicate packets should be sent to a local or remote monitoring DCN. In some embodiments, the monitoring module communicates with a network state database that contains recent network states and connections of different DCNs of the network. In some embodiments a controller (not shown), through the migrator module 580, updates the network state database.

For example, when one of the VMs, including the NVM 520 has to be migrated to another host machine, the controller sends a message to the migrator module 580 to perform the migration operation. The migrator module 580, in turn, not only sends the VM to the other host machine, but also updates the network state database with update information of the migrated VM. Another migrator module on the receiving host machine also updates a local network state on that host machine to show that a new VM is added of the VMs of the receiving host machine. Therefore, each monitoring module, by looking at the network state database, can identify the latest location of a monitoring VM.

Although shown as a set of monitoring modules in this figure, some embodiments provide a single module that handles all of the packets received from all of the GVMs (through any of the ports of the software switch). In yet some other embodiments, each monitoring module is assigned to a particular set of GVMs running on the host machine. For example, for each group of GVMs that execute on the host machine, one monitoring module is assigned to handle the data messages sent from or received by the GVMs of that group.

Being able to automatically switch between interhost and intrahost mirroring for a single mirroring session improves the network's overall efficiency in many ways. For instance, when an interhost mirroring session is initially set up, some embodiments check the possibility of co-locating the monitoring and monitored DCNs first. When the monitoring and monitored DCNs do not execute on the same host machine, some such embodiments move one of the DCNs to the other host machine.

Some embodiments determine other factors before co-locating the monitored and monitoring DCNs. For example, some embodiments consider the workload of the host machines before migrating the DCNs. After both of the monitoring and monitored DCNs are located on the same host machine, these embodiments automatically convert the interhost mirroring session to an intrahost mirroring session. Even if the workload of the host machines are light, since interhost mirroring requires that the network traffic passes through the physical network, it is much more efficient to have monitoring and monitored DCN operate on the same host machine in order to avoid physical network routing.

Some embodiments determine other factors before co-locating the monitored and monitoring DCNs. For example, some embodiments consider the workload of the host machines before migrating the DCNs. After both of the monitoring and monitored DCNs are located on the same host machine, these embodiments automatically convert the interhost mirroring session to an intrahost mirroring session.

Some embodiments, irrespective of the workload on the host machines, or other factors, co-locate the monitoring and monitored DCNs to operate on the same host machine whenever the DCNs are set up to communicate remotely (i.e., whenever an interhost mirroring is set up). Because interhost mirroring requires that network traffic passes through the physical network (e.g., hardware switches, routers, and cables), some embodiments place the monitoring and monitored DCNs on the same host machine in order to avoid physical network routing and to increase the network efficiency.

Figure 6:
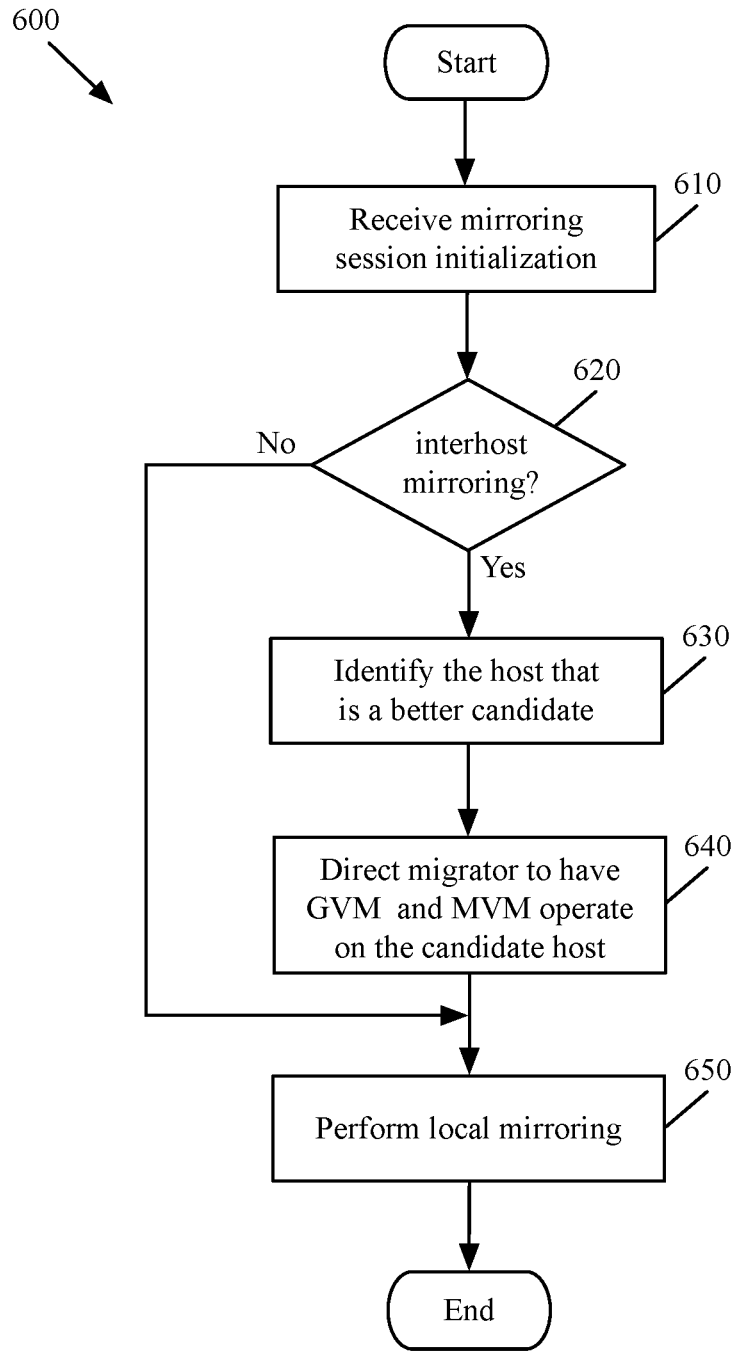
FIG. 6 conceptually illustrates a process of some embodiments for switching a mirroring session that is initially set up as an interhost mirroring to an intrahost mirroring session.

FIG. 6 conceptually illustrates a process 600 of some embodiments for switching a mirroring session that is initially set up as an interhost mirroring to an intrahost mirroring session. In some embodiments, the process is performed by a monitoring module such as one of the set of monitoring modules 530, shown above by reference to FIG. 5.

The process starts by receiving (at 610) a network mirroring session initialization. As described above, a user or network administrator can set up or initialize a mirroring session on a particular port of a switch to which, a DCN is coupled. The user can also define the monitoring end machine to which the mirrored network traffic should be sent. The process of some embodiments, after the user configures a mirroring session, determines (at 620) whether the initialized mirroring session is an interhost mirroring session or an intrahost mirroring session.

When the process determines that the initialized mirroring session is an intrahost mirroring session, the process proceeds to operation 650 to perform local mirroring. The process then ends. On the other hand, when the process determines that the initialized mirroring session is an interhost mirroring session, the process identifies (at 630) the host between the two host machines that is a better candidate for hosting both of the monitoring and monitored DCNs. In some embodiments, the process may look for a third host machine to migrate the DCNs when neither of the host machines that are initially hosting the monitored and monitoring DCNs are good candidates for this purpose.

After identifying a good candidate host machine to move the monitoring and monitored DCNs, the process directs (at 640) the migrator modules that operate on the host machines, to perform the migration operation and relocate one or both of the DCNs. After the migration, the process initializes and performs (at 650) local mirroring instead of remote mirroring. The process then ends.

The specific operations of the process 600 may not be performed in the exact order shown and described. The specific operations may not be performed in one continuous series of operations, and different specific operations may be performed in different embodiments. For example, when the process determines that non of the host machine is a good candidate and moves the DCNs to a third host machine, the process does not perform a local mirroring session because the DCNs are executing on another host machine. In such a situation, the process directs another monitoring module (e.g., through a central management and control system) that runs on the third host machine to perform the local mirroring session.

Additionally, the process 600 could be implemented using several sub-processes, or as part of a larger macro process. For example, operation 650 of the process 600 can be divided to several other operations as discussed for process 300 above by reference to FIG. 3 and the local mirroring may continue until one of the monitoring and monitored DCNs is migrated to another host machine.

In order to reduce the impact of mirrored traffic on production traffic during a remote mirroring session, some embodiments separate the routes of mirrored and production traffics. That is, when an interhost mirroring is set up (or when the mirroring is dynamically switched to an interhost mirroring), some embodiments select two different paths for the duplicate data messages (mirrored traffic) and the original data messages that are sent to, or originated by, the monitored DCN (production traffic). In order to do so, some embodiments send the production traffic to a first physical NIC (PNIC) of the host machine on which the monitored DCN operates, and send the mirrored traffic to a second, different PNIC of the host machine. Some embodiments use different source and destination VTEPs on the source and destination hosts that are set up to route traffic through different PNICs of the host machines.

Figure 7:
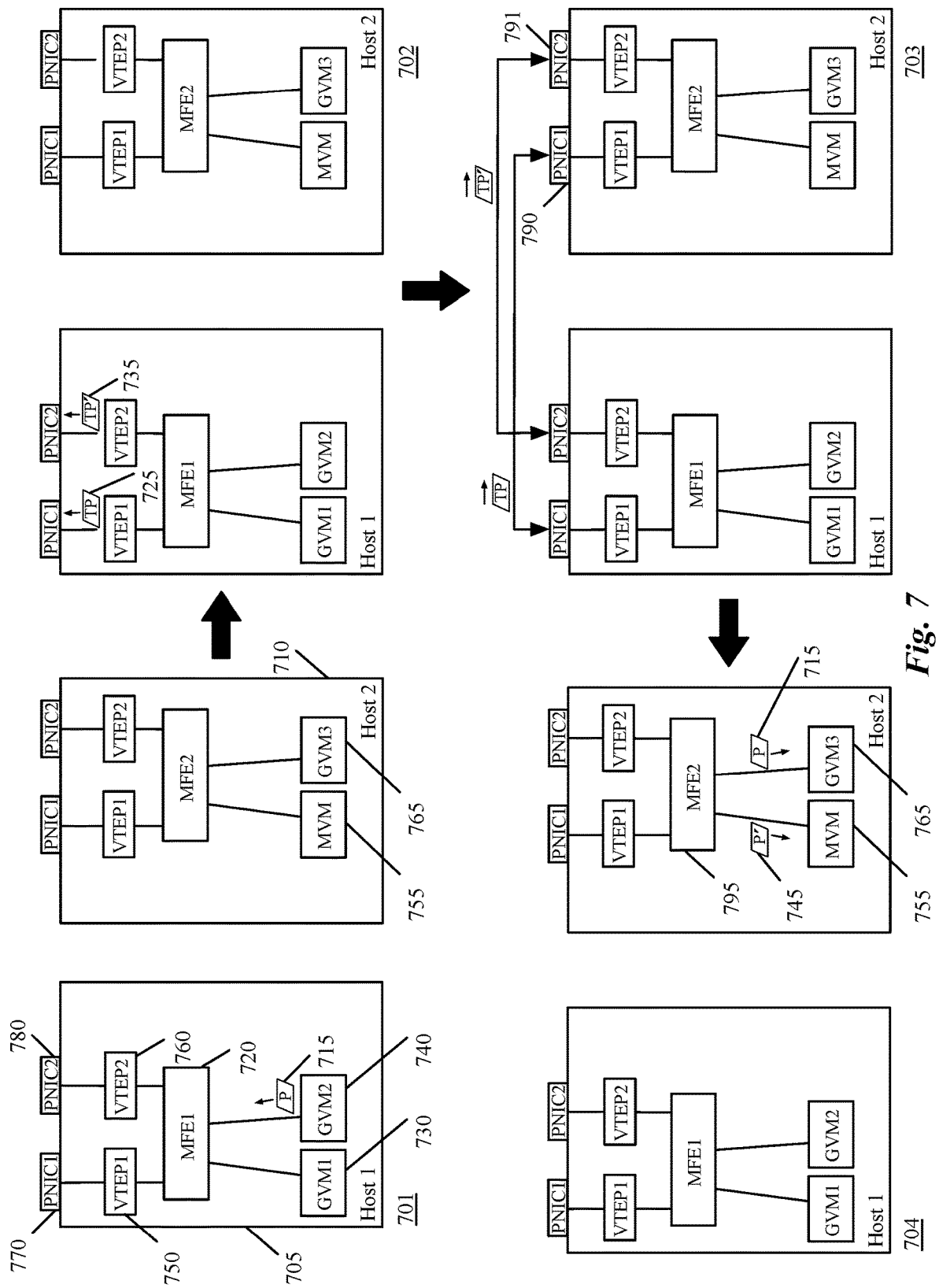
FIG. 7 illustrates a managed forwarding element selecting two different network traffic routes for production and mirrored traffic.

FIG. 7 illustrates a managed forwarding element selecting two different network traffic routes for production and mirrored traffic. That is, this figure shows, in four different stages 701-704, an MFE sending an original packet on a first network route while sending a mirrored packet for the original packet on a second and different network route. The figure shows a first host machine 705 that includes two guest VMs 730 and 740, an MFE 720, and two VTEPs 750 and 760. The host machine 705 also has two separate physical NICs 770 and 780. As discussed above, a host machine may have many more than two PNICs. Conversely, a single PNIC of a host machine may implement several different virtual NICs.

At the first stage 701, the GVM 715 executing on the host machine 705 sends a packet 715 that is destined for GVM 765 executing on a remote host machine 710. Since this GVM (or the VNIC of the GVM through which the packet is sent) is configured to be monitored, each packet that is sent out of the GVM 740 is configured to be mirrored to a monitoring VM 755 that is also executing on the remote host machine 710. As shown in the first stage 701, the packet 715 is being forwarded to MFE 720 to perform forwarding processing for the different logical network elements that MFE the implements. Since the port of MFE 720 is configured to be mirrored, each packet that is received at this port is duplicated and the duplicate packets are sent to the MVM 755.

The second stage 702 shows that the monitoring module executing on the MFE port to which the GVM 740 is connected, has generated a duplicate packet from the original packet 715. The monitoring module (not shown) also determines that the original traffic is being routed through VTEP 750 to PNIC 770 to be sent out of the host machine 705. Since the monitoring module is capable of separating the mirrored traffic from the original traffic, the monitoring module directs the MFE 720 to use another VTEP 760 to send the mirrored traffic out of the host machine through the PNIC 780.

This way, the monitoring module makes sure that the production and mirrored traffics do not use the same network path to reach their corresponding destinations. The second stage 702 shows that the first VTEP 750 has added tunneling data to the original (production) packet 715 and is sending the tunneled packet 725 to the PNIC 770. Similarly, the second VTEP 760 has added tunneling data to the mirrored (and tagged) packet and is sending the ready-to-be-tunneled mirrored packet 735 to the PNIC 780.

The third stage 703 shows that the production traffic is routed between the two host machines through a first network path, while the mirrored traffic is routed through a second, different network path. That is, the third stage shows that the original packet that is encapsulated with the tunneling data (e.g., source and destination IP addresses of the source and destination VTEPs) is being sent from PNIC 770 to PNIC 790. The mirrored packet which is encapsulated with different tunneling data from the original packet, on the other hand, is being sent from the PNIC 780 of the host machine 705 to the PNIC 791 of the Host machine 710.

The fourth stage 704 illustrates that after the production and mirrored traffics are received at the host machine 710, the VTEPs of this host machine and the MFE 795 remove the tunneling data from the packets. The MFE (or the monitoring module responsible for the port of the MFE that is coupled to MVM 755) also removes the additional mirroring identification data from the mirrored packet. The MFE 795 then sends the original packet 715 to its final destination, which is the GVM 765. The MFE 795 also sends the mirrored packet 745, which is an exact duplicate of the original packet 715, to the monitoring VM 755.

In the illustrated example, although the original packet and the mirrored packet are shown to be routed in parallel through the different network elements, in a real situation, these packets do not necessarily move in parallel. That is, at each stage, depending on the resource allocated to process each of the packets, one of the packets might be forwarded ahead of the other packet. For example, when PNIC 770 is busier than PNIC 780, the mirrored and tagged packet 735 may leave the first host machine 705 before the original packet 725. As such, one of the packets may still be in the first host machine while the other packet reaches its final destination.

In some particular types of remote mirroring sessions, some embodiments utilize a caching mechanism that reduces mirrored traffic and allows for more interhost network bandwidth. Specifically, when the monitored DCN exchanges network traffic with another DCN that executes on the same host machine as the monitoring DCN, network traffic is transferred between the host machines twice, once as production traffic and once as mirrored traffic. Some embodiments employ two different caching mechanisms to reduce the mirroring traffic based on the production traffic being initiated by the monitored DCN, or received by the monitored DCN. The outcome of employing these two different mechanisms is preventing a large data packet being transferred on the physical network twice (i.e., once as a production packet and the second time as a mirrored packet).

In the first scenario, a source DCN operating on a first host machine, along with the monitoring DCN, sends a data message (e.g., a packet) to a monitored DCN which operates on a second host machine. Assuming that the packet passes the firewall policy defined for the monitored DCN, a monitoring agent that executes on the first host machine, generates a duplicate of the packet and caches the duplicate packet before the packet is sent to the second host machine. It is important to note that the monitoring agent is a module with a callback function in the I/O chain of each port of an MFE in some embodiments. As such, the monitoring module is not an exclusive function that is defined only for a monitored DCN.

When the monitoring module executing on the first host machine determines that the packet is originated by the source DCN and is destined for the monitored DCN (e.g., from the source and destination IP addresses of the packet), the monitoring agent makes a copy of the packet. The monitoring agent of the first host machine also calculates a checksum for the copied packet. On the other hand, when the monitoring agent of the second host machine intercepts the packet (before the packet reaches the monitored DCN) and identifies the packet as being sent by the source DCN, the monitoring DCN does not generate a duplicate to be sent to the monitoring DCN on the first host machine.

Instead, after ensuring that the packet passes the firewall policy defined for the monitored DCN, the monitoring agent of the second host machine (operating on the monitored MFE port) calculates the checksum for the packet and inserts the checksum in a special construct (e.g., in a small checksum packet). The monitoring agent of the second host machine then sends the checksum packet (instead of a duplicate of a large data packet) to the first host machine. When the monitoring agent of the first host machine receives the checksum packet, the monitoring agent retrieves the corresponding copy of packet (which has the same checksum) from cache and delivers the copy of packet to the monitoring DCN on the first host machine. This way, the duplicate of a packet, which could take a large space (e.g., hundreds of bytes) is not routed to the physical network between the host machines.

Figure 8:
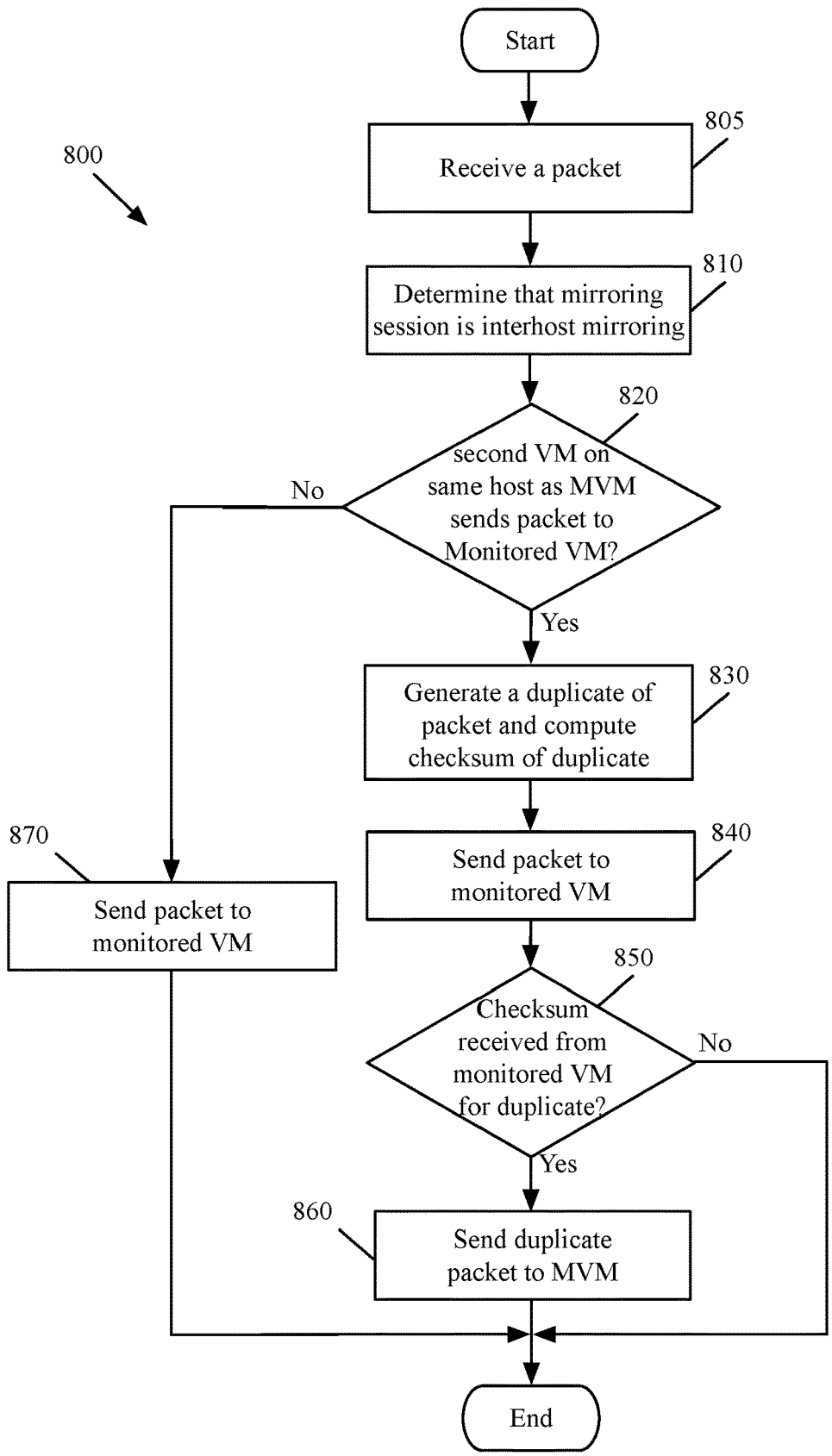
FIG. 8 illustrates a process of some embodiments that utilizes a caching mechanism which reduces mirrored traffic and allows for more interhost network bandwidth.

FIG. 8 illustrates a process 800 of some embodiments that utilizes a caching mechanism which reduces mirrored traffic and allows for more interhost network bandwidth. The process, in some embodiments, is performed by a monitoring module operating on a first host machine (e.g., on an MFE port coupled to a source VM), where a monitoring VM (MVM) executes. The source VM sends data messages to a destination VM that operates on a second host machine and that is coupled to monitored port of a managed forwarding element (MFE).

The process starts by receiving (at 805) a packet. For example, a monitoring module operating on a port of an MFE that is coupled to a source machine that generated the packet, receives the packet at the MFE port. After receiving the packet, the process determines that the packet is for a monitored VM and as such should be mirrored. The process also determines (at 810) that the mirroring session is an interhost session, in which the monitored VM and the monitoring VM execute on two different host machines.

The process of some embodiments makes such determinations by looking at the source and destination addresses carried in the packet's different headers (e.g., source and destination IP headers). The process then determines (at 820) whether the source of the packet (i.e., the source VM) operates on the same host machine as the monitoring VM (MVM). The process makes such determination by employing a network state database such as the network state database 540 described above by reference to FIG. 5.

When the process determines that the source VM does not execute on the same host machine as the MVM, the process sends (at 870) the packet to the destination VM which is being monitored. The process then ends. This is because the monitoring module that operates for the monitored VM will generate a duplicate of the packet and sends the duplicate to the MVM, wherever the MVM operates (as described above).

One the other hand, when the process determines that the source VM executes on the same host machine as the MVM, the process generates (at 830) a duplicate of the packet and computes a checksum for the generated duplicate packet. The process then caches the checksum and allows for the original packet to continue on its path toward the monitored VM (which operates on another host machine). The monitored VM, after receiving the packet and determining that the packet is sent by a source VM that operates next to the monitoring VM, the monitoring DCN instead of generating a duplicate of the packet and sending the duplicate to the monitoring DCN, calculates a checksum for the received packet and sends the checksum (e.g., in a small checksum packet) to the source host machine.

That is, after ensuring that the received packet passes the firewall policy defined for the monitored VM, the monitoring module operating on the monitored MFE port computes a checksum for the packet and inserts the checksum in a special construct (e.g., in a small checksum packet). The monitoring module then sends the checksum packet (instead of a duplicate of a large data packet) to the monitoring module of the source host machine (from where the packet was sent).

When the process receives the checksum packet, the process determines (at 850) whether the checksum packet is for the duplicate packet that the process has generated and stored, along with a checksum of the duplicate, in a cache memory. The process makes such determination by matching the received checksum from the monitored VM against the checksum of the duplicate packet stored in the cache memory. If no match is found, the process ends. On the other hand, when a match is found, the process sends (at 860) the duplicate packet that was cached to the monitoring VM operating on the source host machine.

The specific operations of the process 800 may not be performed in the exact order shown and described. The specific operations may not be performed in one continuous series of operations, and different specific operations may be performed in different embodiments. Additionally, the process 800 could be implemented using several sub-processes, or as part of a larger macro process.

In a second scenario of caching mirrored traffic, a monitored DCN operating on a first host machine sends a data message (e.g., a packet) to a destination DCN, which operates on a second host machine, along with a monitoring DCN. Assuming that the packet passes the firewall policy enforced on the monitored DCN, when the monitoring agent that executes on the first host machine determines that the packet is destined for the destination DCN, the monitoring agent calculates a checksum for the packet. That is, instead of generating a duplicate of the packet (which could be a large packet), the agent generates a small checksum packet and sends the checksum (e.g., through a mirroring route) to the second host machine during the mirroring session. The monitoring agent of the second host machine caches the checksum packet.

It is important to note that the original packet is also sent to the second host machine (e.g., through a production route). When the monitoring agent of the second host machine receives the original packet (on its route to the destination DCN) and identifies the packet as being sent by the monitored DCN (e.g., through the source and destination IP addresses of the packet), the monitoring agent calculates the checksum of the packet. The monitoring agent of the second host machine then matches the calculated checksum against the cached checksum packet that was received from the first host machine. If the checksums match, the monitoring agent of the second host machine generates a copy of the packet and delivers the copy to the monitoring DCN on the second host machine.

In other words, in this scenario, the monitoring module of the monitored port, instead of generating a duplicate packet and sending the duplicate packet to the monitoring VM, only sends a checksum packet to the monitoring VM. The monitoring module of the MVM then generates the duplicate packet and sends the duplicate packet to the MVM, when the monitoring module receives the checksum packet.

Figure 9:
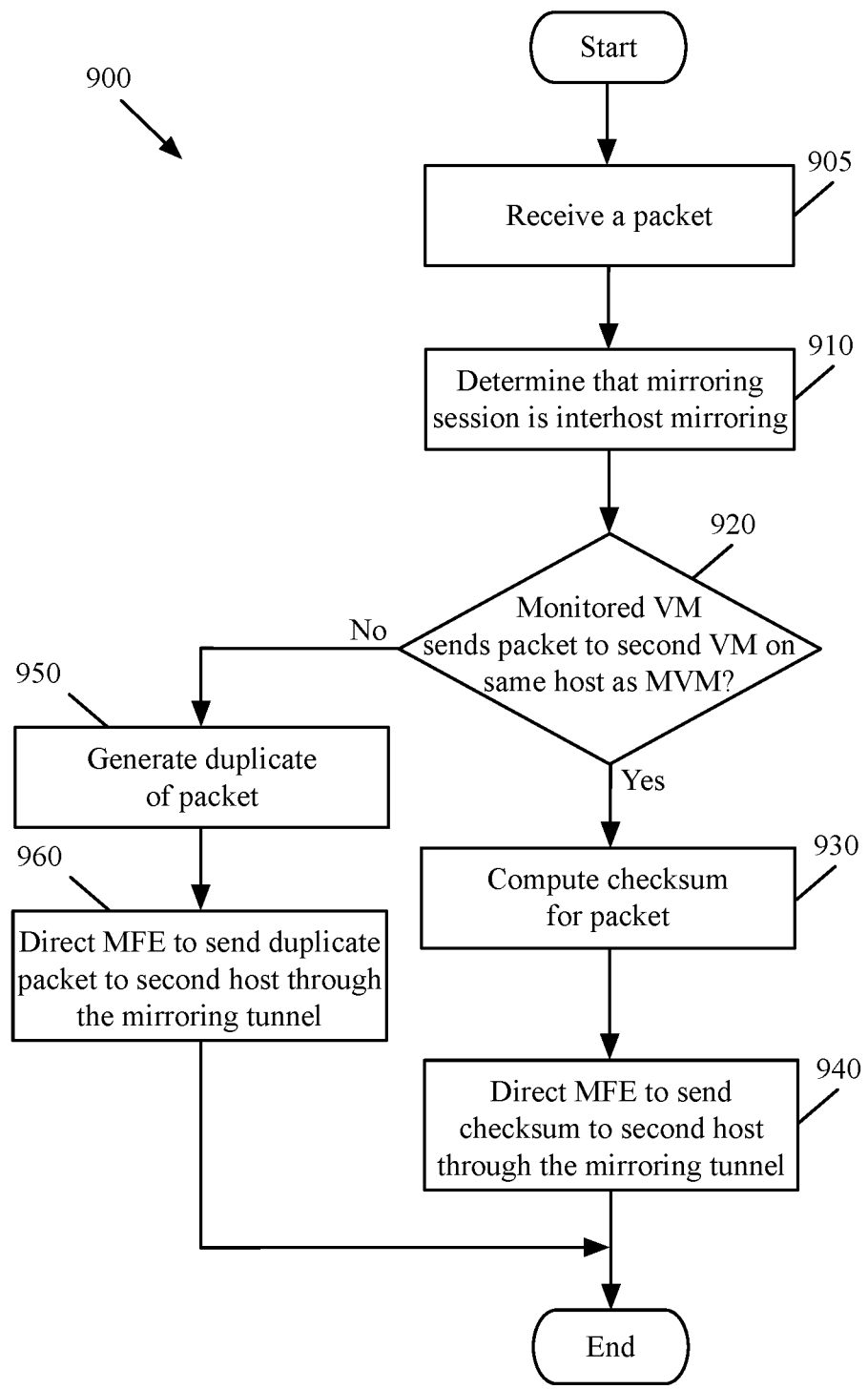
FIG. 9 illustrates a process of some embodiments that utilizes another caching mechanism that reduces mirrored traffic and allows for more interhost network bandwidth.

FIG. 9 illustrates a process 900 of some embodiments that utilizes another caching mechanism that reduces mirrored traffic and allows for more interhost network bandwidth. The process, in some embodiments, is performed by a monitoring module operating on a first host machine (e.g., on an MFE port coupled to a monitored VM). The monitored VM is the source of a data messages that is sent to a destination VM that operates on a second host machine where a monitoring VM is also operating.

The process starts by receiving (at 905) a packet. For example, a monitoring module operating on a port of an MFE that is coupled to monitored VM, receives the packet at the MFE port from the monitored VM. After receiving the packet, the process determines that the packet should be mirrored because it is received at the monitored port of the MFE. The process also determines (at 910) that the mirroring session is an interhost session, in which the monitored VM and the monitoring VM execute on two different host machines.

The process of some embodiments makes such determinations by looking at the source and destination addresses carried in the packet's different headers (e.g., source and destination IP headers). The process then determines (at 920) whether the destination VM operates on the same host machine as the monitoring VM (MVM). The process makes such determination by employing a network state database such as the network state database 540 described above by reference to FIG. 5.

When the process determines that the destination VM does not execute on the same host machine as the MVM, the process generates (at 950) a duplicate of the packet and directs (at 960) the MFE to send the duplicate packet to the MVM wherever the MVM operates. The process then ends. That is, when the MVM and destination VM are not executing on the same host, the monitoring module that operates for the monitored VM does its regular responsibility which is generation of duplicate packets and and sending the duplicate packets to the MVM (as described above).

One the other hand, when the process determines that the destination VM executes on the same host machine as the MVM, the process computes (at 930) a checksum of the packet. The process then sends (at 940) the checksum of the packet to the monitoring VM instead of a duplicate of the packet. The process then ends. As described above, when the monitoring module of the destination VM receives the original packet (on its route to the destination VM) and identifies the packet as being sent by the monitored DCN (e.g., through the source and destination IP addresses of the packet), the monitoring module calculates a checksum of the packet. The monitoring module then matches the calculated checksum against the checksum packet that was received from the source host machine. If the checksums match, the monitoring module of the destination host machine generates a copy of the packet and delivers the copy to the monitoring VM of the host machine.

The specific operations of the process 900 may not be performed in the exact order shown and described. The specific operations may not be performed in one continuous series of operations, and different specific operations may be performed in different embodiments. Additionally, the process 900 could be implemented using several sub-processes, or as part of a larger macro process.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
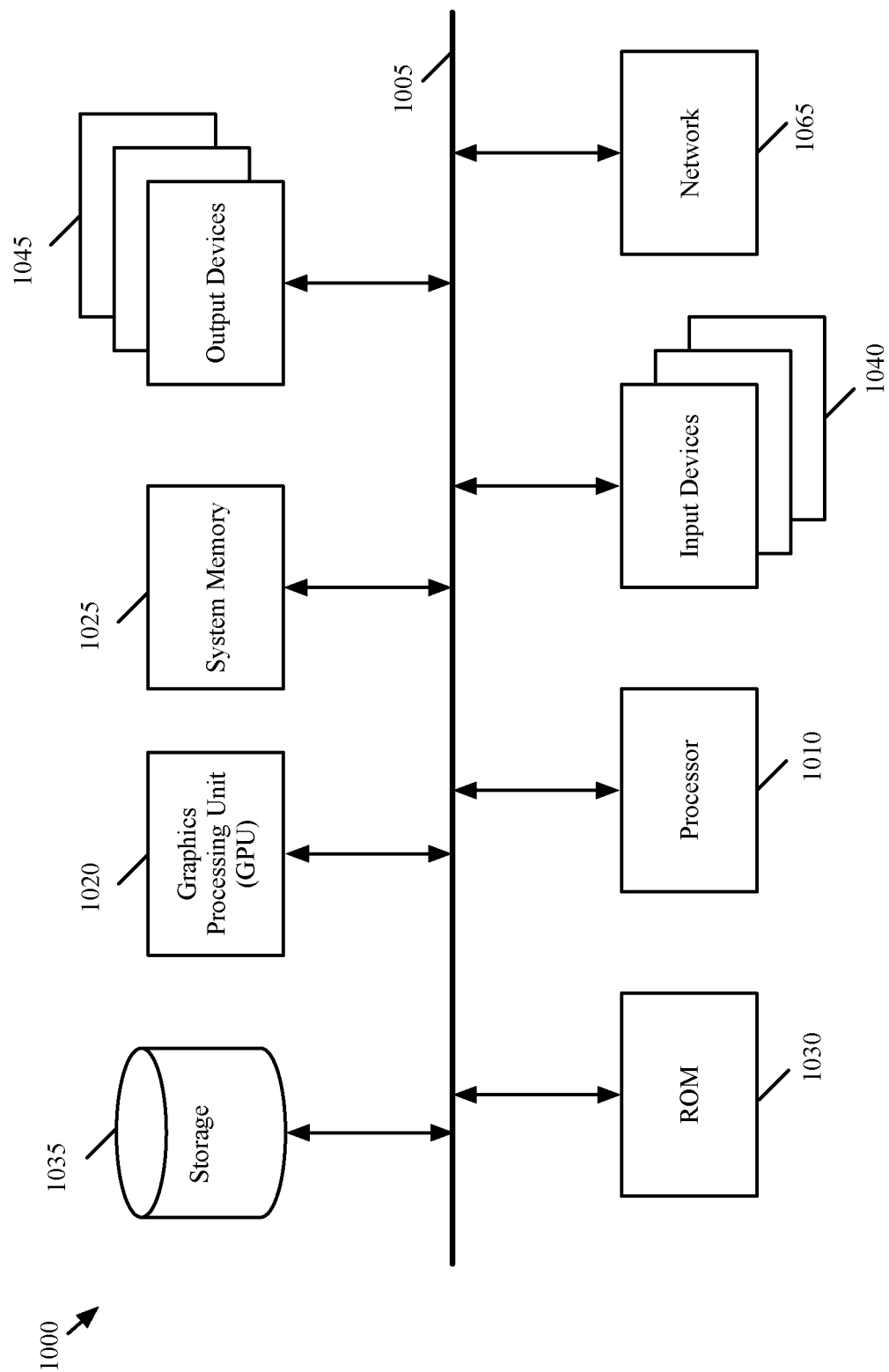
FIG. 10 conceptually illustrates an electronic system with which some embodiments of the invention are implemented.

FIG. 10 conceptually illustrates an electronic system 1000 with which some embodiments of the invention are implemented. The electronic system 1000 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieves instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash memory device, etc., and its corresponding drive) as the permanent storage device. Like the permanent storage device 1035, the system memory 1025 is a read-and-write memory device. However, unlike storage device 1035, the system memory 1025 is a volatile read-and-write memory, such a random access memory. The system memory 1025 stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alphanumeric keyboards and pointing devices (also called "cursor control devices"), cameras (e.g., webcams), microphones or similar devices for receiving voice commands, etc. The output devices 1045 display images generated by the electronic system or otherwise output data. The output devices 1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

Additionally, the term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. In addition, a number of the figures (including FIGS. 3, 6, 8 and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for mirroring data messages, the method comprising:
at a monitoring module that (i) is stored in memory of a first host computer and (ii) is executed by at least one processor of the first host computer:
receiving a data message from a guest data compute node (DCN) executing on the first host computer, the guest DCN connecting to a managed forwarding element (MFE) of the first host computer via a port that is configured for mirroring of data traffic;
generating a copy of the data message to be sent to a monitoring DCN;
determining whether the monitoring DCN, to which the generated copy of the data message will be sent, executes on the first host computer; and
when the monitoring DCN executes on a second host computer, providing the generated copy of the data message to the MFE along with tunneling data that enables the MFE to encapsulate the copy of the data message for transmission to the second host computer,
wherein, when the monitoring DCN executes on the first host computer, the generated copy of the data message is sent to the monitoring DCN on the first host computer.

2. The method of claim 1, wherein the MFE uses the tunneling data to encapsulate the copy of data message using a tunnel header comprising (i) an internet protocol (IP) address of a first virtual tunnel endpoint (VTEP) of the first host computer as a source address, (ii) an IP address of a second VTEP of the second host computer as a destination address, and (iii) identification data that identifies the copy of the data message as a mirrored data message.

3. The method of claim 2, wherein the MFE stores the identification data in a reserved field of the tunnel header.

4. The method of claim 2, wherein the MFE sends the encapsulated copy of the data message to the first VTEP, wherein the first VTEP tunnels the encapsulated copy of the data message to the second VTEP.

5. The method of claim 4, wherein the second VTEP, after receiving the encapsulated copy of the data message, decapsulates the copy of the data message and sends the copy of the data message towards the monitoring DCN based on the identification data in the tunnel header encapsulating the copy of the data message.

6. The method of claim 1, wherein receiving the data message comprises receiving the data message at the port of the MFE to which the guest DCN connects.

7. The method of claim 6, wherein the port of the MFE to which the guest DCN connects is a first port, wherein if the monitoring DCN executes on the first host computer, the generated copy of the data message is sent to a second port of the MFE to which the monitoring DCN connects.

8. The method of claim 1, wherein the guest DCN is a first guest virtual machine (VM) and the received data message is a packet sent by the first guest VM to a second guest VM.

9. The method of claim 1, wherein:
the data message has a destination address of a second DCN that executes on the second host computer; and
the original received data message is encapsulated by the MFE differently than the generated copy of the data message so that the original data message and the generated copy of the data message are sent to the second host computer through different tunnels.

10. The method of claim 9, wherein the generated copy of the data message is encapsulated with an internet protocol (IP) address of a first virtual tunnel endpoint (VTEP) of the first host computer as a source address and an IP address of a second VTEP of the second host computer as a destination address, wherein the second tunneling data comprises an IP address of a third VTEP of the first host computer as a source address and an IP address of a fourth VTEP of the second host computer as a destination address.

11. The method of claim 1, wherein the monitoring DCN is migrated from the second host computer to the first host computer.

12. A non-transitory machine readable medium of a first host computer storing a monitoring module which, when executed by at least one processing unit of the first host computer, mirrors data messages, the monitoring module comprising sets of instructions for:
receiving a data message from a guest data compute node (DCN) executing on the first host computer, the guest DCN connecting to a managed forwarding element (MFE) of the first host computer via a port that is configured for mirroring of data traffic;
generating a copy of the data message to be sent to a monitoring DCN;
determining whether the monitoring DCN, to which the generated copy of the data message will be sent, executes on the first host computer;
when the monitoring DCN executes on a second host computer rather than the first host computer, providing the generated copy of the data message to the MFE along with tunneling data that enables the MFE to encapsulate the copy of the data message for transmission to the second host computer; and
when the monitoring DCN executes on the first host computer, sending the generated copy of the data message to the monitoring DCN on the first host computer without any encapsulation.

13. The non-transitory machine readable medium of claim 12, wherein the MFE uses the tunneling data to encapsulate the copy of data message using a tunnel header comprising (i) an internet protocol (IP) address of a first virtual tunnel endpoint (VTEP) of the first host computer as a source address, (ii) an IP address of a second VTEP of the second host computer as a destination address, and (iii) identification data that identifies the copy of the data message as a mirrored data message.

14. The non-transitory machine readable medium of claim 13, wherein the MFE stores the identification data in a reserved field of the tunnel header.

15. The non-transitory machine readable medium of claim 12, wherein the program further comprises sets of instructions for:
    determining that the monitoring DCN comprises a physical machine rather than a machine that executes on a host computer; and
    based on said determination, providing the copy of the data message to the MFE along with tunneling data that enables the MFE to encapsulate the copy of the data message for transmission to a managed hardware switch to which the physical machine is connected.

16. The non-transitory machine readable medium of claim 15, wherein the managed hardware switch comprises a third-party top-of-rack switch and the physical machine comprises a log server.

17. A method for mirroring data messages, the method comprising:
    at a monitoring module that (i) is stored, along with a monitoring first data compute node (DCN), in memory of a first host computer and (ii) is executed, along with the monitoring DCN, by at least one processor of the first host computer:
        receiving a first data message from a second DCN that also executes on the first host computer, the first data message directed to a third DCN executing on a second different host computer, wherein the monitoring first DCN monitors the third DCN;
        generating a copy of the first data message and storing the copy;
        calculating a value based on data carried by the first data message; and
        upon receiving, from the second host computer, a second data message comprising the same calculated value that the second host computer sends to the first host computer in lieu of duplicating the first data message for the monitoring first DCN, sending the copy of the first data message to the monitoring first DCN on the first host computer.

18. The method of claim 17, wherein the monitoring module is a first monitoring module, wherein a second monitoring module, that is stored in memory of the second host computer and executed by at least one processor of the second host computer calculates the value based on data carried by the first data message upon receiving the first data message.

19. The method of claim 17, wherein the second data message is smaller than the copy of the first data message and therefore utilizes less network bandwidth between the first and second host computers.

20. The method of claim 17, wherein if the monitoring first DCN is migrated from the first host computer to a third host computer, the second host computer generates duplicates of subsequent data messages sent from the second DCN to the third DCN and sends the duplicated data messages to the third host computer for deliver to the monitoring first DCN.

21. The method of claim 17, wherein the calculated value comprises a checksum for the first data message.

* * * * *